US010401227B2

(12) United States Patent
Harada et al.

(10) Patent No.: US 10,401,227 B2
(45) Date of Patent: Sep. 3, 2019

(54) COLORIMETRY DEVICE AND COLORIMETRY METHOD

(71) Applicant: KONICA MINOLTA INC., Chiyoda-ku (JP)

(72) Inventors: Koji Harada, Sakai (JP); Satoshi Yokota, Toyonaka (JP)

(73) Assignee: KONICA MINOLTA, INC., Tokyo (JP)

( * ) Notice: Subject to any disclaimer, the term of this patent is extended or adjusted under 35 U.S.C. 154(b) by 39 days.

(21) Appl. No.: 15/557,697

(22) PCT Filed: Feb. 17, 2016

(86) PCT No.: PCT/JP2016/054593
§ 371 (c)(1),
(2) Date: Sep. 12, 2017

(87) PCT Pub. No.: WO2016/152334
PCT Pub. Date: Sep. 29, 2016

(65) Prior Publication Data
US 2018/0045572 A1 Feb. 15, 2018

(30) Foreign Application Priority Data
Mar. 26, 2015 (JP) .................. 2015-063720

(51) Int. Cl.
*G01J 3/52* (2006.01)
*B41J 29/46* (2006.01)
(Continued)

(52) U.S. Cl.
CPC .................. *G01J 3/52* (2013.01); *B41J 2/525* (2013.01); *B41J 29/46* (2013.01); *G01J 3/50* (2013.01);
(Continued)

(58) Field of Classification Search
CPC .... B41J 29/46; B41J 2/525; G01J 3/50; G01J 3/52; G06T 1/00; G06T 7/60;
(Continued)

(56) References Cited

U.S. PATENT DOCUMENTS

| 6,765,674 B2* | 7/2004 | Orelli ........................ G01J 3/02 356/402 |
| 2009/0316234 A1* | 12/2009 | Yamamoto ........... H04N 1/6033 358/505 |
| 2010/0067783 A1* | 3/2010 | Horita ..................... H04N 1/603 382/162 |
| 2010/0165363 A1 | 7/2010 | Marcu |
| 2011/0058195 A1* | 3/2011 | Kano ....................... H04N 1/46 358/1.9 |
| 2011/0115856 A1* | 5/2011 | Harada ................. B41J 2/16532 347/85 |

(Continued)

FOREIGN PATENT DOCUMENTS

| JP | 2000-253262 | 9/2000 |
| JP | 2007-81684 | 3/2007 |
| JP | 2014-132257 | 7/2014 |
| WO | WO 2013/145295 | 10/2013 |

*Primary Examiner* — Negussie Worku
(74) *Attorney, Agent, or Firm* — Cozen O'Connor

(57) ABSTRACT

A colorimetry device and a colorimetry method according to the present invention relatively move the position of a color measuring unit with respect to a color chart to the position of each of a plurality of patches obtained based on an image of the color chart by a moving unit for a chart region selected by a user out of chart regions extracted based on the image of the color chart, and measure the color of each of the plurality of patches by the color measuring unit.

7 Claims, 22 Drawing Sheets

(51) Int. Cl.
  *G06T 7/60* (2017.01)
  *H04N 1/00* (2006.01)
  *B41J 2/525* (2006.01)
  *G06T 1/00* (2006.01)
  *H04N 1/60* (2006.01)
  *G01J 3/50* (2006.01)
  *H04N 1/48* (2006.01)

(52) U.S. Cl.
  CPC .................. *G06T 1/00* (2013.01); *G06T 7/60* (2013.01); *H04N 1/00816* (2013.01); *H04N 1/48* (2013.01); *H04N 1/60* (2013.01); *H04N 2201/0081* (2013.01); *H04N 2201/0089* (2013.01)

(58) Field of Classification Search
  CPC ........ H04N 1/00816; H04N 1/48; H04N 1/60; H04N 2201/0081; H04N 2201/0089
  USPC .................................................. 358/1.9, 505
  See application file for complete search history.

(56) References Cited

U.S. PATENT DOCUMENTS

| | | | |
|---|---|---|---|
| 2013/0163011 A1* | 6/2013 | Yamaguchi | H04N 1/60 358/1.9 |
| 2016/0147542 A1* | 5/2016 | Kishi | G06F 21/57 713/2 |
| 2016/0301830 A1* | 10/2016 | Shibata | H04N 1/6036 |
| 2017/0052068 A1* | 2/2017 | Nagai | G01J 3/50 |
| 2017/0080714 A1* | 3/2017 | Suzuki | B41J 2/16505 |
| 2017/0314993 A1* | 11/2017 | Harada | G01J 3/52 |
| 2017/0314994 A1* | 11/2017 | Tanimura | G01J 3/46 |
| 2018/0027132 A1* | 1/2018 | Yamasaki | G06T 11/60 358/504 |
| 2018/0052052 A1* | 2/2018 | Tanimura | G01J 3/52 |
| 2018/0149521 A1* | 5/2018 | Fujino | B41J 2/2103 |

* cited by examiner

EDGE LINES(−), INTERMEDIATE LINES(⋯) AND PATCH CENTER POSITIONS(◯)

| CHART REGION ID | REGION COORDINATES |
|---|---|
| 101 | (x11,y11) (x12,y12) |
| 102 | (x21,y21) (x22,y22) |
| 103 | (x31,y31) (x32,y32) |
| ... | ... |

| CHART REGION ID | PATCH MARK COORDINATES |
|---|---|
| 101 | (x1101,y1101) |
| | (x1102,y1102) |
| | (x1103,y1103) |
| | (x1104,y1104) |
| | ... |

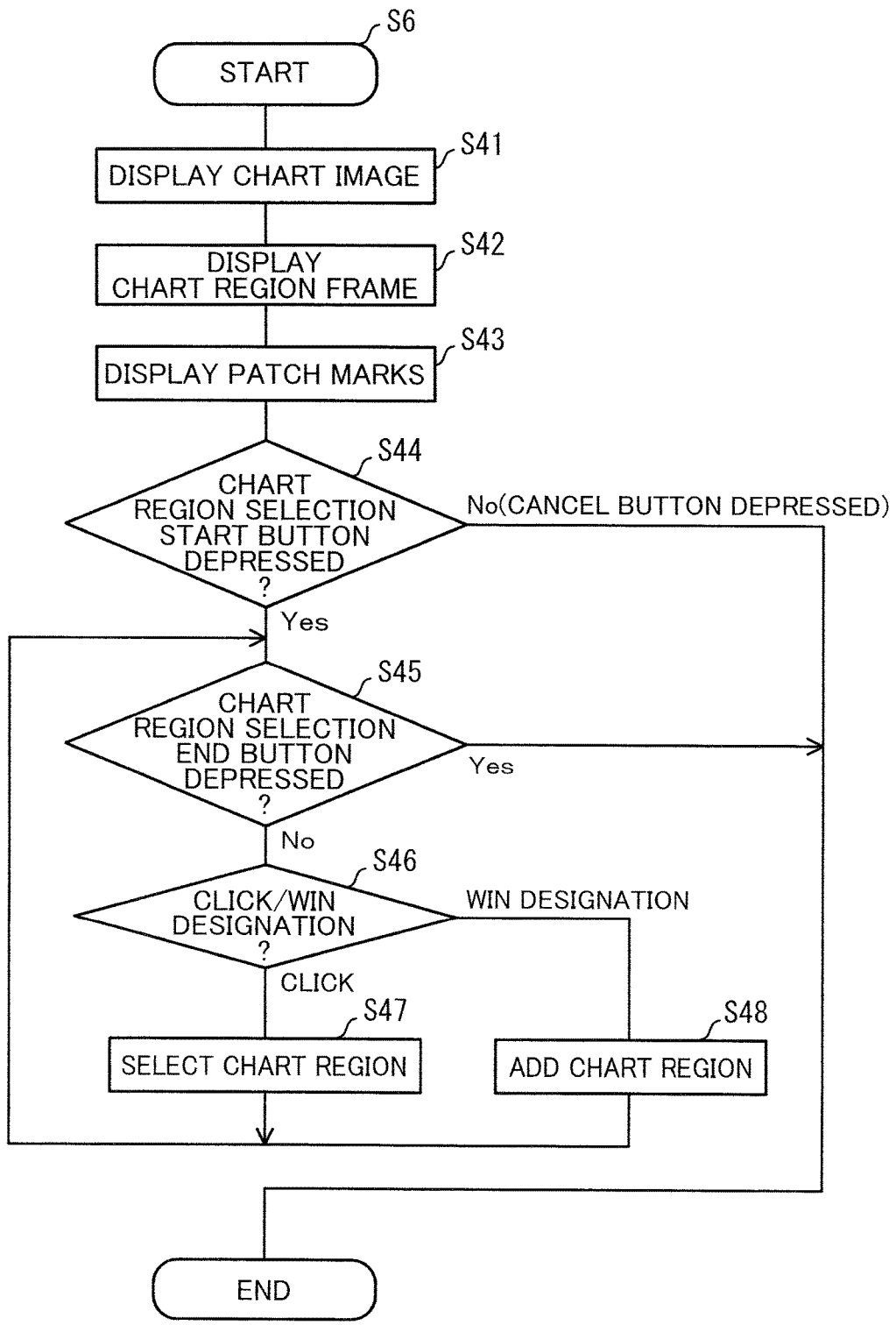

COLORIMETRY DEVICE AND COLORIMETRY METHOD

RELATED APPLICATIONS

This is a U.S. National Phase Application under 35 USC 371 of International Application PCT/JP2016/054593 filed on Feb. 17, 2016.

This application claims the priority of Japanese application no. 2015-063720 filed Mar. 26, 2015, the entire content of which is hereby incorporated by reference.

TECHNICAL FIELD

The present invention relates to a colorimetry device and a colorimetry method for measuring color and particularly to a colorimetry device and a colorimetry method capable of properly determining chart regions and measuring color at an appropriate position in a desired charge region.

BACKGROUND ART

For example, a company which produces a color printed matter such as a printing company regularly measures the color of the printed matter and adjusts colors of a printing apparatus having printed that printed matter to maintain the quality of the printed matter. In such a color adjustment of the printing apparatus, raw image data called a color chart is, for example, printed by the printing apparatus and the color of each patch in this printed color chart is measured by a colorimetry device. A color shift amount between an actually measured value of the color of each patch and a target value of the color of each patch is evaluated and the colors of the printing apparatus are adjusted according to this evaluation result.

The color chart is composed of a plurality of color samples called the patches, and a plurality of patches are in mutually different colors (hue, intensity, saturation) in many cases, and are arranged in a predetermined mode. Such color charts come in various types. For example, there are color charts configured by arranging a plurality of square patches having various colors in vertical and horizontal directions in a two-dimensional array. Color charts of such a mode have various patterns depending on contents to be evaluated such as by arranging the respective patches to have a random color array and arranging the respective patches to reduce a change in shading between the patches adjacent to each other as in gradation. Such color charts are not only produced by a user using a color chart production tool provided by a manufacturer of the colorimetry device, but also provided from a public institution. As just described, color charts have, indeed, various patterns due to differences in the shape, arrangement, color scheme and the like of patches.

On the other hand, the number of colors used in the color adjustment of a printing apparatus is increasing year by year. According to this, the number of patches arranged in a color chart is also increasing and, in addition, the size (area) of each patch is small.

Due to such circumstances, it has become practically impossible to measure color by manually precisely aligning a measuring part of the colorimetry device with each patch. Thus, a system is desired which automatically measures the position of each patch, automatically aligns the measuring part of the colorimetry device with the measured position of each patch and automatically measures the color of each patch. As an example of such a system, a method for capturing a two-dimensional color image of a color chart desired to be measured, calculating the positions of patches by an image processing technique using a computer and moving a color measuring head to the determined patch positions to measure colors of the color chart is proposed in patent literature 1 by Gretag-Macbeth.

As described above, color charts come in various types. Color charts of one type include not only a chart region where a plurality of patches are present, but also a normal image region where a normal image obtained by imaging a landscape, animal(s)/plant(s), people/people, goods, character(s) (symbol(s)) or the like is present. Whether or not a target region is a chart region is not discriminated in the patch position automatic measuring method for automatically measuring the positions of the patches disclosed in the above patent literature 1. Thus, if a color chart including such a normal image region is measured, the positions of the patches is measured with the normal image region also as a measurement object. Thus, in the patch position automatic measuring method disclosed in the above patent literature 1, the positions of the patches may be erroneously detected. Further, a user may desire the measurement of the colors of some of the detected patches.

CITATION LIST

Patent Literature

Patent literature 1: Specification of U.S. Pat. No. 6,765,674

SUMMARY OF INVENTION

The present invention was an invention developed in view of the above situation and aims to provide a colorimetry device and a colorimetry method capable of properly determining chart regions and measuring color at an appropriate position in a desired chart region.

A colorimetry device and a colorimetry method according to the present invention relatively move the position of a color measuring unit with respect to a color chart to the position of each of a plurality of patches obtained based on an image of the color chart by a moving unit for a chart region selected by a user out of chart regions extracted based on the image of the color chart, and measure the color of each of the plurality of patches by the color measuring unit. Thus, the colorimetry device and the colorimetry method according to the present invention can properly determine the chart regions and measure color at an appropriate position in a desired chart region.

The above and other objects, features and advantages of the present invention will become apparent from the following detailed description and the accompanying drawings.

BRIEF DESCRIPTION OF DRAWINGS

FIG. 22 is a flow chart showing the operation of a chart region selection processing unit in the colorimetry device of the embodiment.

DESCRIPTION OF EMBODIMENT

Hereinafter, one embodiment according to the present invention is described on the basis of the drawings. Note that, in each figure, components denoted by the same reference signs are identical and the description thereof is omitted as appropriate. In this specification, components are denoted by reference signs without suffix when being collectively called, while being denoted by reference signs with suffix when being individually indicated.

Figure 1:
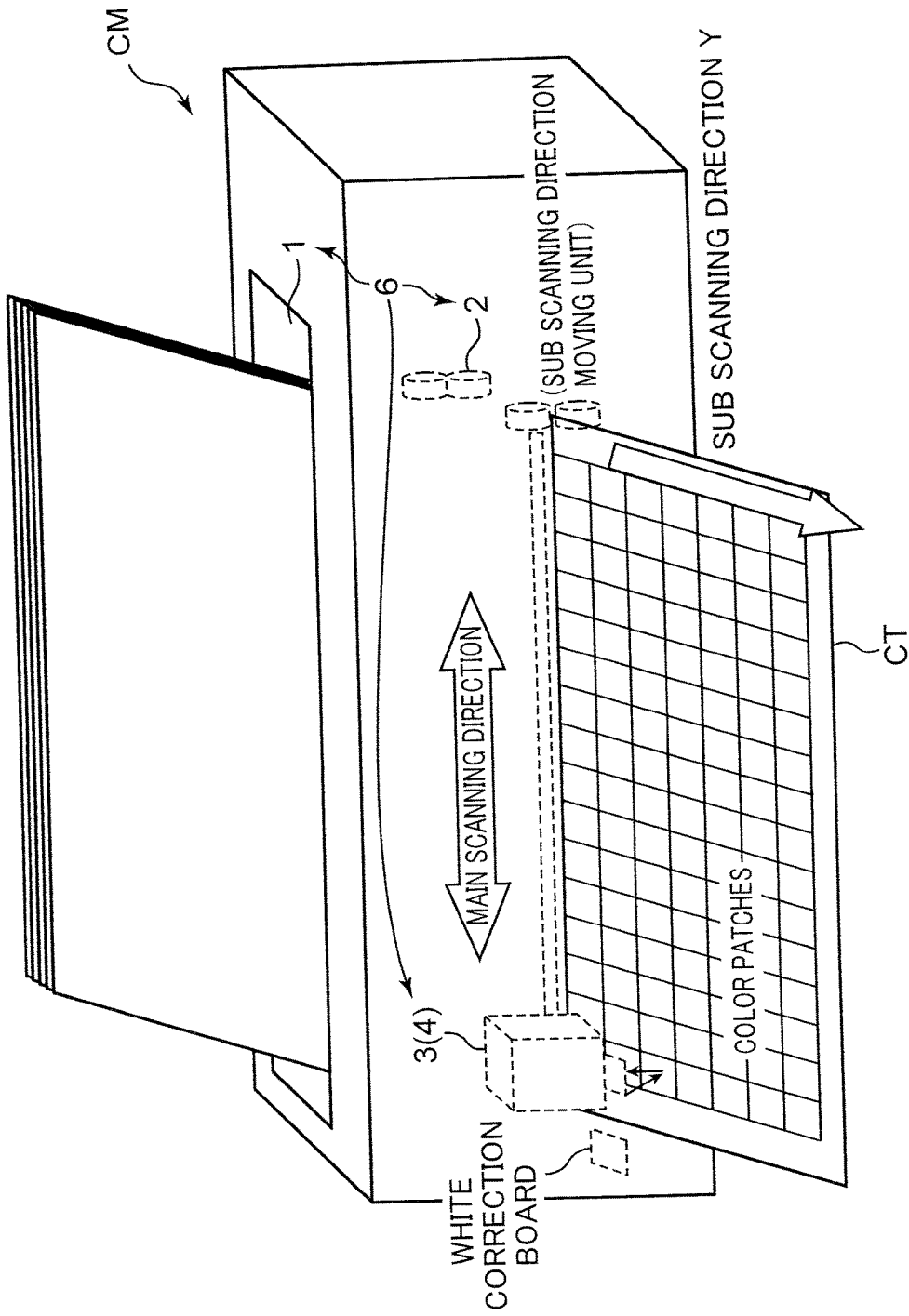
FIG. 1 is a perspective view showing a schematic configuration of a colorimetry device in an embodiment.
Figure 2:
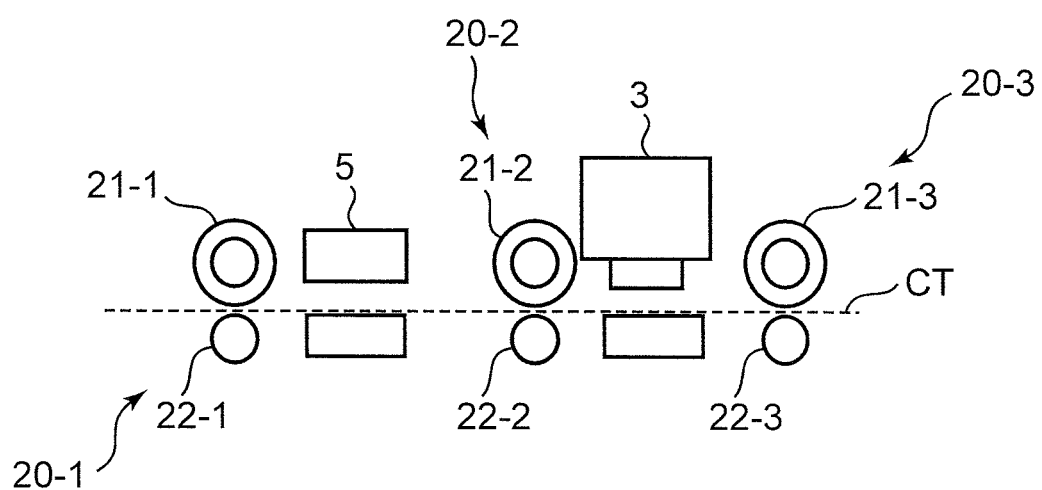
FIG. 2 is a schematic side view showing an arrangement relationship of an imaging unit and a color measuring unit in the colorimetry device of the embodiment.
Figure 3:
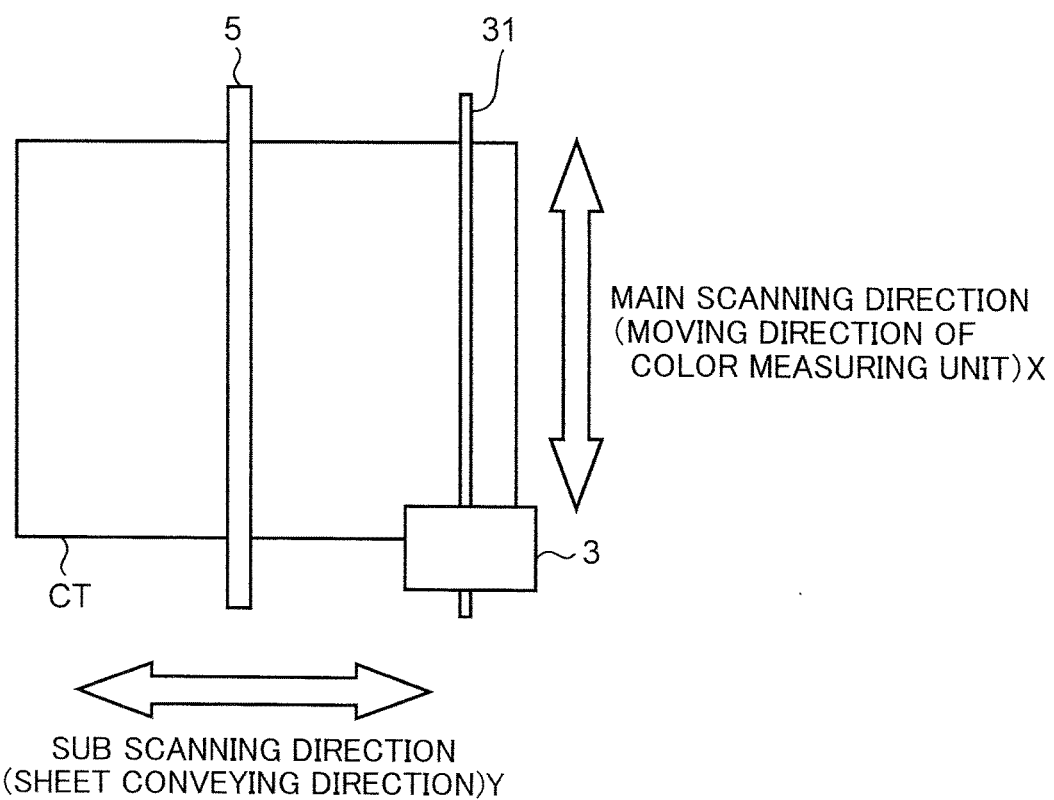
FIG. 3 is a schematic top view showing the arrangement relationship of the imaging unit and the color measuring unit in the colorimetry device of the embodiment.
Figure 4:
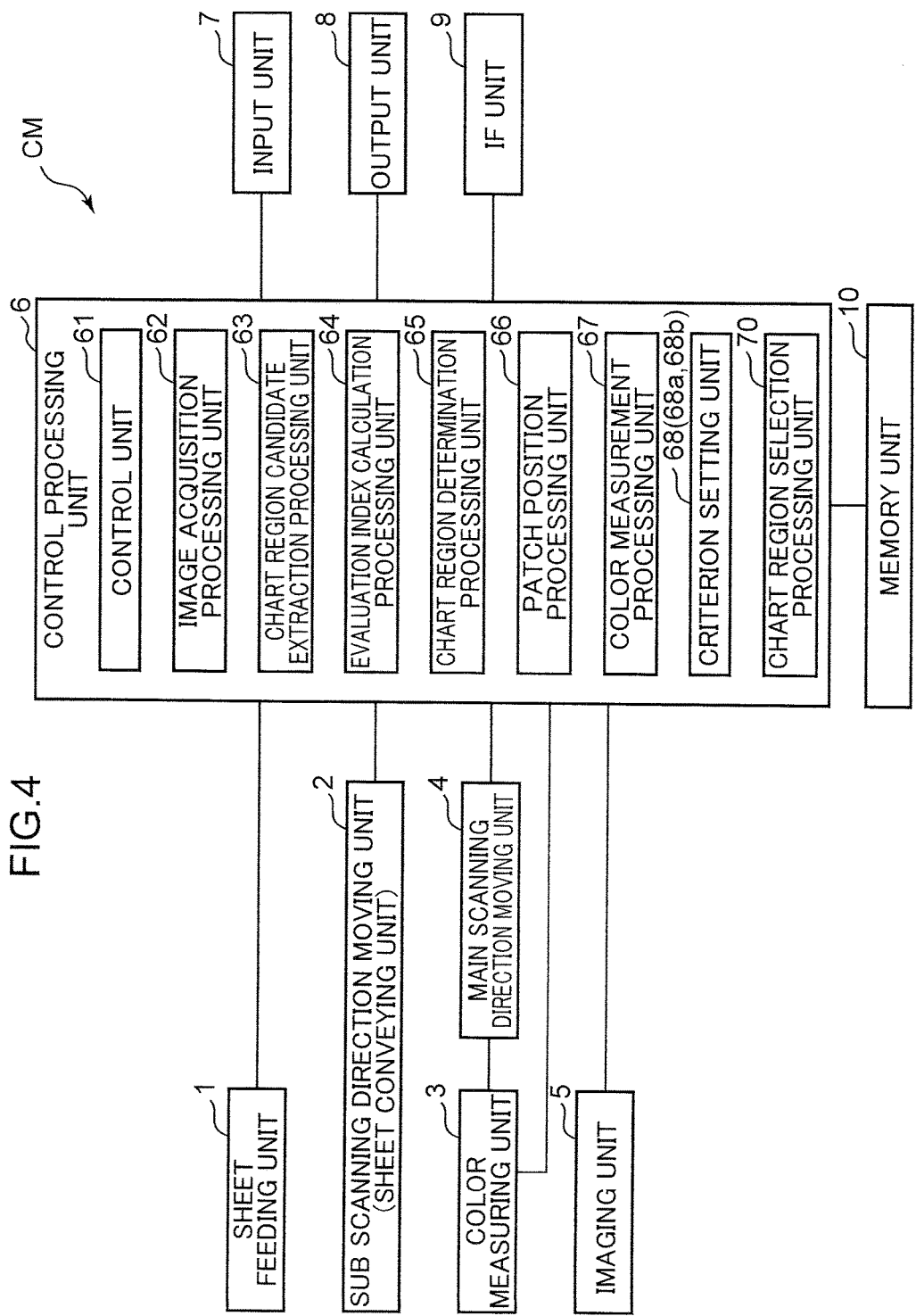
FIG. 4 is a block diagram showing an electrical configuration of the colorimetry device in the embodiment.
Figure 5:
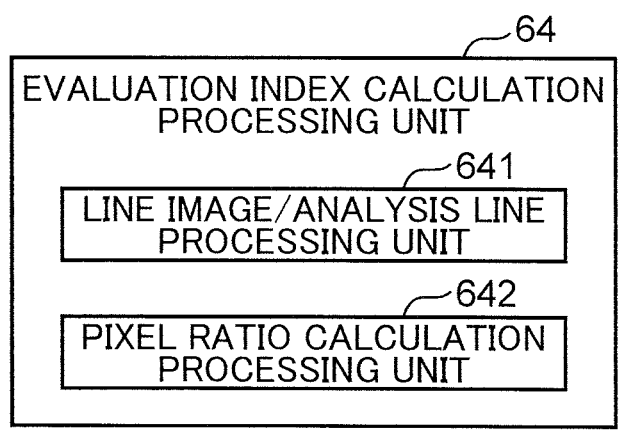
FIG. 5 is a block diagram showing the configuration of an evaluation index calculation processing unit in the colorimetry device in the embodiment.

FIG. 1 is a perspective view showing a schematic configuration of a colorimetry device in the embodiment. FIG. 2 is a schematic side view showing an arrangement relationship of an imaging unit and a color measuring unit in the colorimetry device of the embodiment. FIG. 3 is a schematic top view showing the arrangement relationship of the imaging unit and the color measuring unit in the colorimetry device of the embodiment. FIG. 4 is a block diagram showing an electrical configuration of the colorimetry device in the embodiment. FIG. 5 is a block diagram showing the configuration of an evaluation index calculation processing unit in the colorimetry device of the embodiment.

A colorimetry device CM in this embodiment is a device for measuring the color (hue, intensity, saturation) of a measurement object to be measured as a colorimetric object and, for example, includes a sheet feeding unit 1, a sub scanning direction moving unit (sheet conveying unit) 2, a color measuring unit 3, a main scanning direction moving unit 4, an imaging unit 5, a control processing unit 6, an input unit 7, an output unit 8, an interface unit (IF unit) 9 and a memory unit 10 as shown in FIGS. 1 to 5.

The sheet feeding unit 1 is a sheet feeding mechanism connected to the control processing unit 6 and configured to fetch a measurement object sheet set in the colorimetry device CM into the colorimetry device CM in accordance with a control of the control processing unit 6. The measurement object sheet may be arbitrary, but is a color chart CT having a plurality of patches, which are regions of predetermined colors, on a predetermined sheet, for example, in the case of adjusting colors of a printing apparatus. The sheet feeding unit 1 includes, for example, a storage unit for storing measurement object sheets, a fetching unit for picking up the measurement object sheet stored in the storage unit and feeding the measurement object sheet into the colorimetry device CM, the fetching unit having, for example, a pick-up roller and the like, and a feeding unit for conveying the measurement object sheet fetched by the fetching unit to the sub scanning direction moving unit 2, the feeding unit having, for example, a conveyor roller and the like.

The sub scanning direction moving unit (sheet conveying unit) 2 is a sheet conveying mechanism connected to the control processing unit 6 and configured to convey the measurement object sheet fed from the sheet feeding unit 1 by each predetermined amount in a sub scanning direction (second direction) perpendicular to a first direction set in advance as a main scanning direction in response to a unit conveyance command (second unit conveyance command) in accordance with a control of the control processing unit 6. The sub scanning direction moving unit 2 is configured to be able to convey the measurement object sheet in forward and reverse directions along the sub scanning direction. Forward feed is, for example, the conveyance of the measurement object sheet from an upstream side (side of the sheet feeding unit 1) to a downstream side (discharge side), and reverse feed is the conveyance of the measurement object sheet in the reverse direction opposite to the forward direction, i.e. from the downstream side to the upstream side. The sub scanning direction moving unit 2 includes, for example, a plurality of sheet conveyor roller units, drivers for rotationally driving the sheet conveyor roller units, and the like. Each sheet conveyor roller unit is composed of a drive roller configured to be rotationally driven by the driver, a driven roller configured to be rotationally driven in accordance with the rotational drive of the drive roller and the like. The driver includes, for example, a stepping motor (stepping motor for sub scanning). In the sub scanning direction moving unit 2 thus configured, the stepping motor for sub scanning rotates by a predetermined angle ($21^{st}$ angle) when one drive pulse (second drive pulse, an example of the second unit conveyance command) is input, the drive roller also rotates by a predetermined angle ($22^{nd}$ angle) by the rotation of this stepping motor for sub scanning, and the measurement object sheet is conveyed (moved) by a predetermined amount along the sub scanning direction by the rotation of this drive roller. More specifically, in an example shown in FIG. 2, the sub scanning direction moving unit 2 includes three first to third sheet conveyor roller units 20-1 to 20-3. These first to third sheet conveyor roller units 20-1 to 20-3 are successively disposed from the upstream side to the downstream side along the sub scanning direction. The first to third sheet conveyor roller units 20-1 to 20-3 respectively include first to third drive rollers 21-1 to 21-3 and first to third driven rollers 22-1 to 22-3. Note that the first to third drive rollers 21-1 to 21-3 are rotated by unillustrated first to third stepping motors configured to rotate in synchronization with each other. In the forward feed, the measurement object sheet fed from the sheet feeding unit 1 is sandwiched between a pair of the first drive roller 21-1 and the first driven roller 22-1 and conveyed from the first sheet conveyor roller unit 20-1 to the second sheet conveyor roller unit 20-2 by the first drive roller 21-1 being rotationally driven in the forward direction (e.g. counterclockwise direction) by the driver. The measurement object sheet conveyed to the second sheet conveyor roller unit 20-2 is similarly conveyed from the second sheet conveyor roller unit 20-2 to the third sheet conveyor roller unit 20-3 by the second sheet conveyor roller unit 20-2. The measurement object sheet conveyed to the third sheet conveyor roller unit 20-3 is similarly conveyed from the third sheet conveyor roller unit 20-3 to the downstream side by the third sheet conveyor roller unit 20-3. In the reverse feed, the measurement object sheet is conveyed from the downstream side to the upstream side by these first to third drive rollers 21-1 to 21-3 being rotationally driven in the reverse direction (clockwise direction in the above example) contrary to the above forward feed.

Note that, in the following description, the main scanning direction (first direction) is referred to as an X direction (horizontal direction), a coordinate axis set along this X direction is referred to as an X axis, the sub scanning direction (second direction) is referred to as a Y direction (vertical direction), a coordinate axis set along this Y direction is referred to as a Y axis, and these are used as appropriate (hereinafter, this two-dimensional coordinate system is referred to as a world coordinate system). These X and Y axes match X and Y axes of the world coordinate system XY by setting a coordinate origin (world coordinate origin) PO0 at a predetermined position set in advance in an image imaged by the imaging unit 5, e.g. on a left-upper vertex (left-upper end) of the image in a plan view (see FIG. 8).

The color measuring unit 3 is a device connected to the control processing unit 6 and configured to measure the color of the measurement object in accordance with a control of the control processing unit 6. The color measuring unit 3 is, for example, a colorimetric sensor or the like for obtaining predetermined optical information in the measurement object to obtain the color of the measurement object. Such a color measuring unit 3 is, for example, a spectral colorimeter including a spectral optical element, a photoelectric conversion element and the like for measuring a reflectance (or transmittance) at each wavelength and configured to measure the color of an object based on the reflectance (or transmittance) at each wavelength. Further, the color measuring unit 3 is, for example, a tristimulus value type colorimeter including an optical filter, a photoelectric conversion element and the like for measuring tristimulus values of RGB and configured to measure the color of an object based on color differences of the tristimulus values. The color measuring unit 3 is white-corrected by measuring a so-called white correction board (standard white board) shown by broken line in FIG. 1 and capable of reflecting wavelengths in a measurement range with a high reflectance (e.g. about 90% to about 99%).

The main scanning direction moving unit 4 is a moving mechanism connected to the control processing unit 6 and configured to move the color measuring unit 3 by a predetermined amount in the main scanning direction (first direction) in response to a predetermined unit conveyance command (first unit conveyance command) in accordance with a control of the control processing unit 6. The main scanning direction moving unit 4 includes a guide member for guiding the color measuring unit 3, a feeding mechanism such as a rack and a pinion or a feed screw for moving the color measuring unit 3 by being guided by the guide member, and a feeding mechanism driver such as a stepping motor (stepping motor for main scanning) for driving the feeding mechanism. For example, as shown in FIG. 3, the main scanning direction moving unit 4 includes a rack 31 extending along the main scanning direction and obtained by applying gear cutting to a rod in the form of a flat plate and a pinion (not shown) provided in the color measuring unit 3 and configured to be rotationally driven, for example, by the stepping motor for main scanning, and the pinion and the rack 31 are meshed. In the main scanning direction moving unit 4 thus configured, the stepping motor for main scanning rotates by a predetermined angle ($11^{th}$ angle) when one drive pulse (first drive pulse, an example of the first unit conveyance command) is input, the pinion also rotates by a predetermined angle ($12^{th}$ angle) by the rotation of this stepping motor for main scanning, and the color measuring unit 3 is conveyed (moved) by a predetermined amount in the main scanning direction along the rack 31.

The imaging unit 5 is a device connected to the control processing unit 6 and configured to image an optical image of an object in accordance with a control of the control processing unit 6. The imaging unit 5 includes, for example, a line sensor (linear image sensor) or the like in which a plurality of photoelectric conversion elements are arranged along one direction, and is disposed to extend along the main scanning direction (X direction) with the one direction serving as an arrangement direction of the plurality of photoelectric conversion elements matched with the main scanning direction (X direction) as shown in FIG. 3.

As shown in FIG. 2, such an imaging unit 5 is disposed between the first and second sheet conveyor roller units 20-1 and 20-2, and the color measuring unit 3 and the main scanning direction moving unit 4 are so disposed that the color measuring unit 3 moves along the main scanning direction between the second and third sheet conveyor roller units 20-2 and 20-3. The imaging unit 5 generates an image of the measurement object sheet (image data) by imaging the measurement object sheet for each line extending along the main scanning direction (X direction) while conveying the measurement object sheet in the sub scanning direction (Y direction) by the sub scanning direction moving unit 2. By conveying the measurement object sheet in the sub scanning direction (Y direction) by the sub scanning direction moving unit 2, a relative position Y of the measurement object sheet and the color measuring unit 3 in the sub scanning direction can be changed. Further, by moving the color measuring unit 3 itself in the main scanning direction (X direction) by the main scanning direction moving unit 4, a relative position X of the measurement object sheet and the color measuring unit 3 in the main scanning direction can be changed. In this way, the color measuring unit 3 can move to an arbitrary position (X, Y) on the measurement object sheet and measure color at that position (X, Y).

As just described, in this embodiment, the color measuring unit 3 can be moved only in the main scanning direction with respect to the measurement object sheet by the main scanning direction moving unit 4. On the other hand, the measurement object sheet is moved along the sub scanning direction by the sub scanning direction moving unit (sheet conveying unit) 2. Thus, in this embodiment, the main scanning direction moving unit 4 and the sub scanning direction moving unit 2 correspond to an example of a moving unit for relatively moving the position of the color measuring unit with respect to the measurement object sheet.

The input unit 7 is a device connected to the control processing unit 6 and, for example, configured to input various commands such as a command for instructing the color measurement of an object and various pieces of data necessary in color measurement such as identifiers on the measurement object to the colorimetry device CM, and includes, for example, a plurality of input switches having predetermined functions assigned thereto, a keyboard, a mouse and the like. The output unit 8 (display unit) is a device connected to the control processing unit 6 and configured to output the command and data input from the input unit 7 and the color of the measurement object measured by the colorimetry device CM in accordance with a control of the control processing unit 6 and is, for example, a display device such as a CRT display, a liquid crystal display or an organic EL display.

Note that the input unit 7 and the output unit 8 may constitute a touch panel. In the case of constituting this touch panel, the input unit 7 is a position input device for detecting and inputting an operation position, for example, by a resistance film method or electrostatic capacitance method, and the output unit 8 is a display device. In this touch panel, the position input device is provided on a display surface of the display device, and one or more inputtable candidates for input content are displayed on the display device. When a user touches a display position displaying the input content desired to be input, the position thereof is detected by the position input device, and the display content displayed at the detected position is input as a user operation input content to the colorimetry device CM. In such a touch panel, since the user can intuitively easily understand an input operation, the colorimetry device CM easily handled by the user is provided.

The IF unit 9 is a circuit connected to the control processing unit 6 and configured to input and output data to and from an external device in accordance with a control of the control processing unit 6 and is, for example, an RS-232 interface circuit of a serial communication type, an interface circuit using Bluetooth (registered trademark) standards, an interface circuit configured to carry out infrared communication of IrDA (Infrared Data Association) standards or the like, or an interface circuit using USB (Universal Serial Bus) standards.

The memory unit 10 is a circuit connected to the control processing unit 6 and configured to store various predetermined programs and various pieces of predetermined data in accordance with a control of the control processing unit 6. The various predetermined programs include control processing programs such as a color measurement program for measuring the color of a measurement object, a chart region detection program for obtaining a chart region of the color chart CT if the measurement object is the color chart CT and a position measurement program for obtaining the position of each patch in the color chart CT if the measurement object is the color chart CT. The various pieces of predetermined data include image data of the color chart CT serving as the measurement object, data indicating the position of each patch in the color chart CT and the like. The memory unit 10 includes, for example, a ROM (Read Only Memory) which is a nonvolatile memory element, an EEPROM (Electrically Erasable Programmable Read Only memory), which is a rewritable nonvolatile memory element, and the like. The memory unit 10 includes a RAM (Random Access Memory) serving as a so-called working memory of the control processing unit 6 for storing data and the like generated during the execution of the predetermined programs.

The control processing unit 6 is a circuit for controlling each component of the colorimetry device CM according to functions of each component and obtaining the color of the measurement object. The control processing unit 6 includes, for example, a CPU (Central Processing Unit) and its peripheral circuits. The control processing unit 6 is configured to functionally include a control unit 61, an image acquisition processing unit 62, a chart region candidate extraction processing unit 63, an evaluation index calculation processing unit 64, a chart region determination processing unit 65, a patch position processing unit 66, a color measurement processing unit 67, a criterion setting unit 68 and a chart region selection processing unit 70 by executing the control processing programs.

The control unit 61 is for controlling each component of the colorimetry device CM according to functions of each component.

The image acquisition processing unit 62 obtains an image on the measurement object sheet such as the color chart CT by the imaging unit 5. More specifically, since the imaging unit 5 includes the line sensor and the like in this embodiment, the image acquisition processing unit 62 obtains the image of the measurement object sheet such as the color chart CT by imaging the measurement object sheet by the imaging unit 5 while conveying the measurement object sheet by the sub scanning direction moving unit (sheet conveying unit) 2.

The chart region candidate extraction processing unit 63 extracts chart region candidates serving as candidates for the chart region where a plurality of patches are present based on the image of the color chart CT obtained by the image acquisition processing unit 62. More specifically, the chart region candidate extraction processing unit 63 binarizes the image of the color chart CT obtained by the image acquisition processing unit 62 and extracts regions equal to or larger than a minimum patch area set in advance as chart region candidates from the image obtained by this binarization (binarized image).

The evaluation index calculation processing unit 64 obtains an evaluation value indicating a degree of the chart region candidates being the chart region based on the image of the chart region candidate for the chart region candidates extracted by the chart region candidate extraction processing unit 63. More specifically, the evaluation index calculation processing unit 64 includes, for example, a line image/analysis line processing unit 641 and a pixel ratio calculation processing unit 642 as shown in FIG. 5 in this embodiment. The line image/analysis line processing unit 641 obtains line images of the chart region candidate based on the image of the chart region candidate, and obtains straight lines included in these obtained line images as analysis lines. The pixel ratio calculation processing unit 642 obtains a ratio of a first pixel number, which is a total number of pixels constituting the image of the color chart CT obtained by the image acquisition processing unit 62, and a second pixel number, which is a total number of pixels in overlapping parts of the line images obtained by the line image/analysis line processing unit 641 within a predetermined range from the analysis lines obtained by the line image/analysis line processing unit 641, and obtains an evaluation value based on this obtained ratio. The predetermined range is appropriately set in advance. Further, the pixel ratio calculation processing unit 642 may obtain a total number of pixels in overlapping parts of the line images and the analysis lines obtained by the line image/analysis line processing unit 641 as the second pixel number. Further, the pixel ratio calculation processing unit 642 may set the ratio of the first and second pixel numbers itself as the evaluation value or the pixel ratio calculation processing unit 642 may set a result obtaining by applying at least one of addition, subtraction, multiplication and division of a predetermined constant (parameter) to the ratio of the first and second pixel numbers as the evaluation value.

The chart region determination processing unit 65 determines whether or not the chart region candidate extracted by the chart region candidate extraction processing unit 63 is the chart region based on the evaluation value obtained by the evaluation index calculation processing unit 64 corresponding to the chart region candidate extracted by the chart region candidate extraction processing unit 63. More specifically, in this embodiment, the chart region determination processing unit 65 determines whether or not the chart region candidate extracted by the chart region candidate extraction processing unit 63 is the chart region based on the evaluation value obtained by the evaluation index calculation processing unit 64 corresponding to the chart region candidate extracted by the chart region candidate extraction processing unit 63 by using a criterion.

The patch position processing unit 66 obtains the positions of a plurality of patches based on the image of the color chart obtained by the image acquisition processing unit 62 for the chart region candidate determined as the chart region by the chart region determination processing unit 65. More specifically, in this embodiment, the patch position processing unit 66 generates binarized horizontal edge image data and binarized vertical edge image data in each of the horizontal direction (main scanning direction, X direction) and the vertical direction (sub scanning direction, Y direction), for example, by binarizing the image of the color chart CT using an edge filter used to detect edges extending in one direction in the image in the chart region, detects horizontal edge lines and vertical edge lines in each of the horizontal and vertical directions by applying a Hough transform to the generated binarized horizontal edge image data and binarized vertical edge image data, and obtains intersections of intermediate lines of these edge lines as the positions of the respective patches.

The color measurement processing unit 67 measures the color of each of the plurality of patches by the color measuring unit 3 by relatively moving the position of the color measuring unit 3 with respect to the color chart CT to the position of each of the plurality of patches obtained by the patch position processing unit 66 by the sub scanning direction moving unit 2 and the main scanning direction moving unit 4.

The criterion setting unit 68 sets the criterion used in the chart region determination processing unit 65. More specifically, in this embodiment, the criterion setting unit 68 is, for example, a criterion setting unit 68a for setting the criterion based on the evaluation value obtained by the evaluation index calculation processing unit 64.

The chart region selection processing unit 70 displays images (chart region frames) indicating the chart regions determined by the chart region determination processing unit 65, images (patch marks) indicating the respective positions of the plurality of patches obtained by the patch position processing unit 66 and the like in a superimposing manner on the image of the color chart CT obtained by the image acquisition processing unit 62 on the output unit 8 and obtains the chart region (chart region of the colorimetric object) of the patches, whose colors are measured by the color measurement processing unit 67, from the user.

Figure 7:
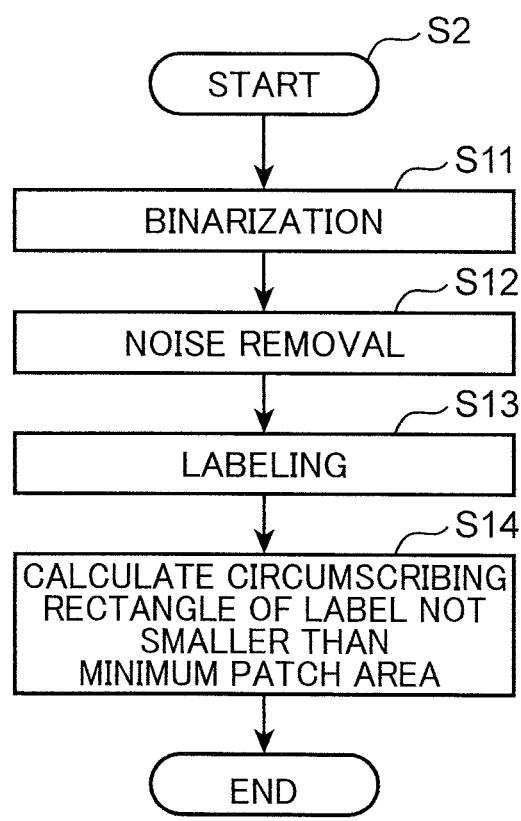
FIG. 7 is a flow chart showing the operation of a chart region candidate extraction processing unit in the colorimetry device of the embodiment, FIG. 8 are charts showing the operation of the chart region candidate extraction processing unit in the colorimetry device of the embodiment.
Figure 9:
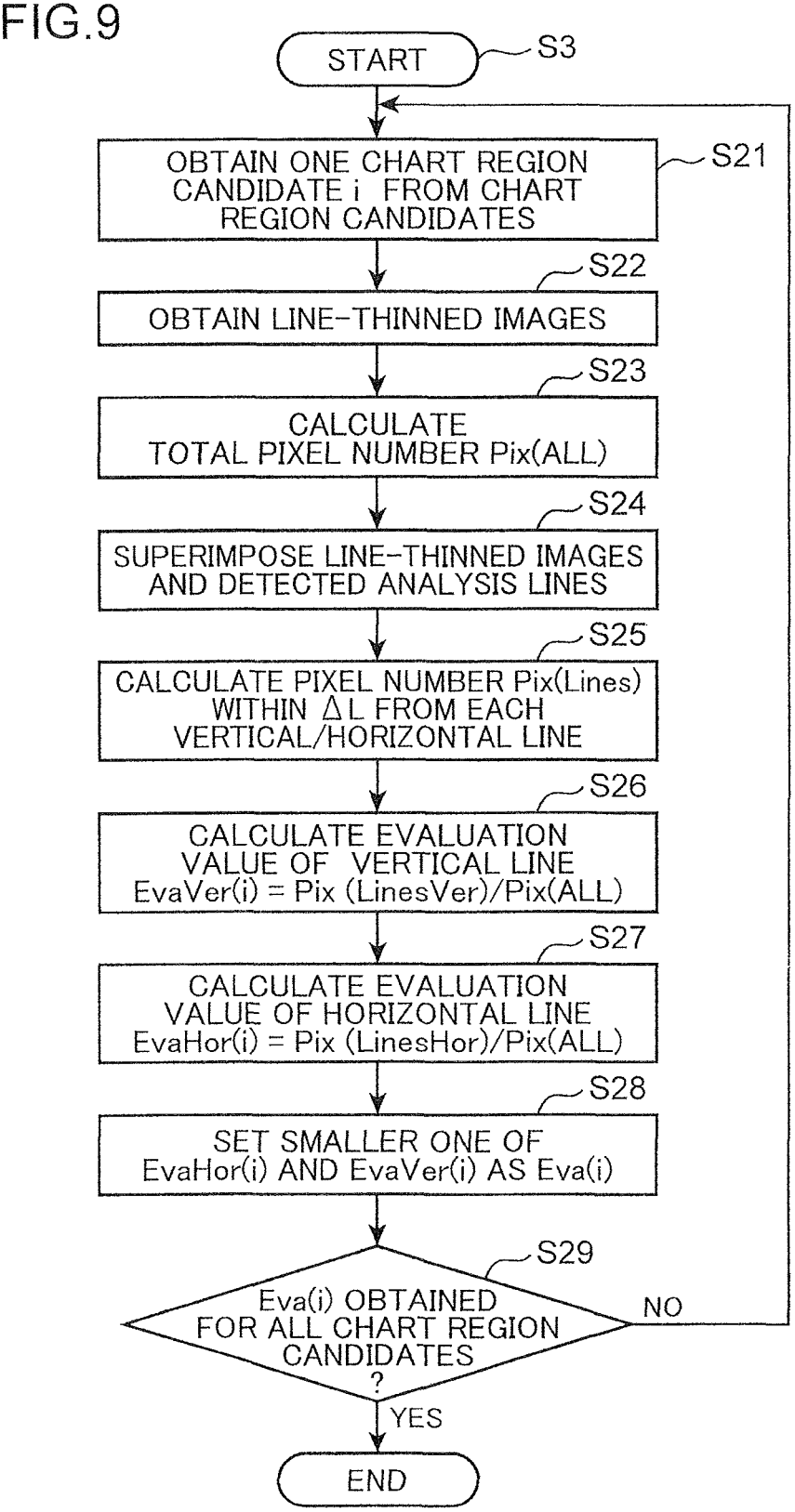
FIG. 9 is a flow chart showing the operation of the evaluation index calculation processing unit, FIG. 10 are charts showing the operation of the evaluation index calculation processing unit in the colorimetry device in the embodiment.
Figure 10A:
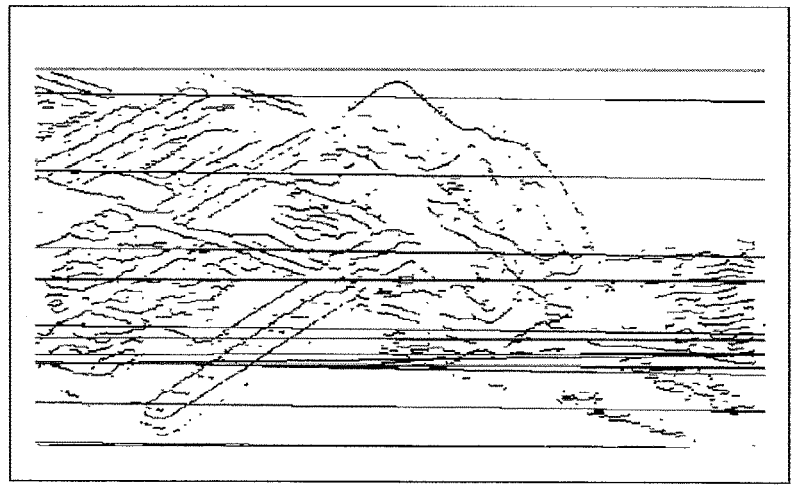
Figure 10B:
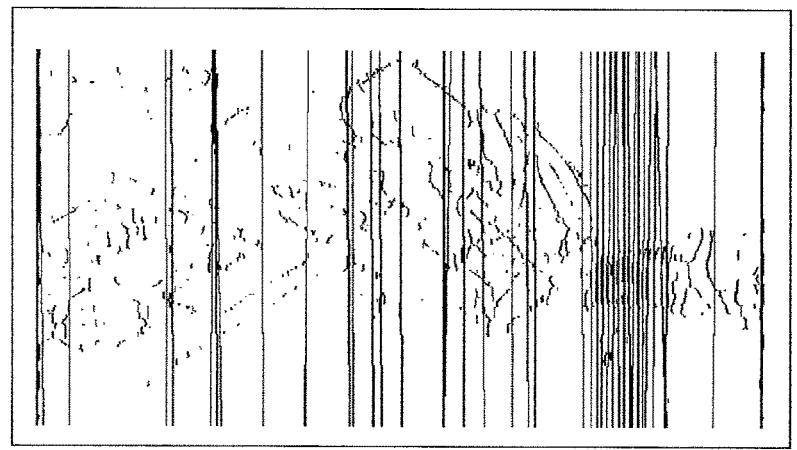
Figure 11:
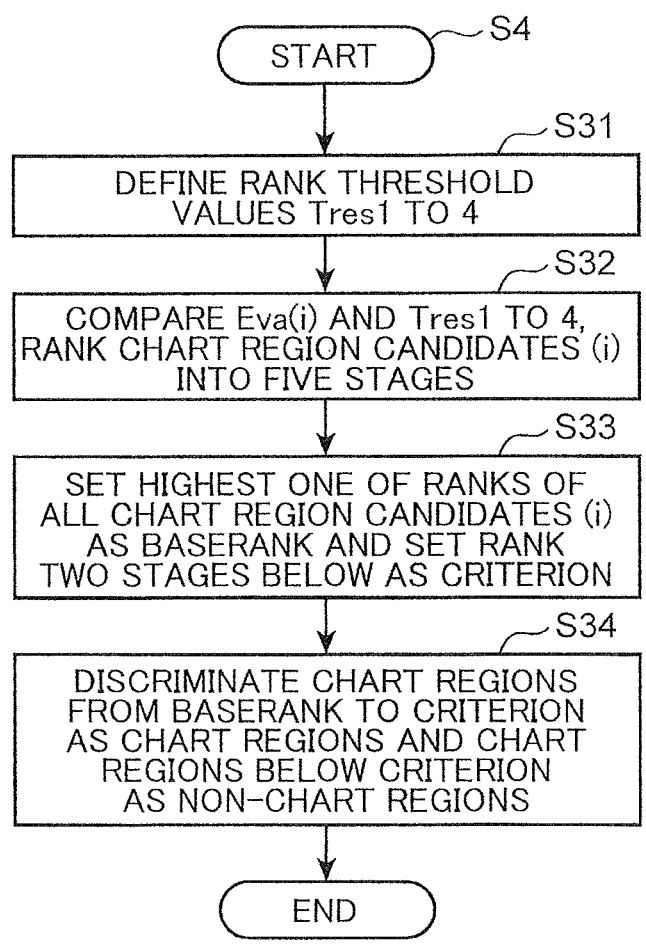
FIG. 11 is a flow chart showing the operation of a chart region determination processing unit in the colorimetry device of the embodiment.
Figure 12:
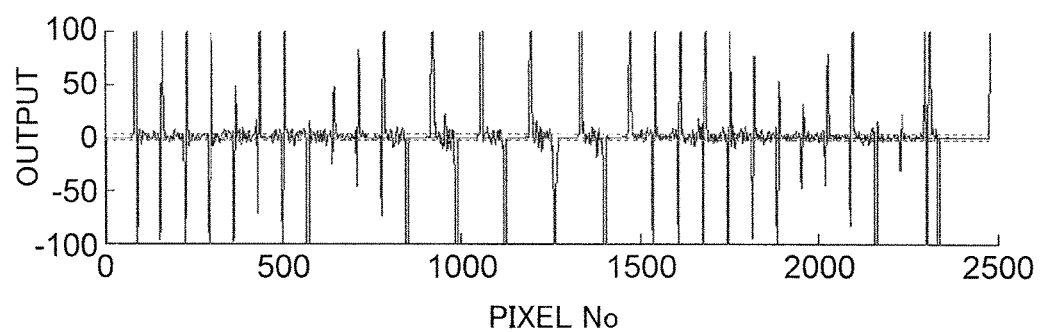
FIG. 12 is a chart showing an example of a processing result of processing an image at a certain position in a Y direction by a differential filter having difference interval N points along a horizontal direction for a color chart shown in FIG. 18.
Figure 13:
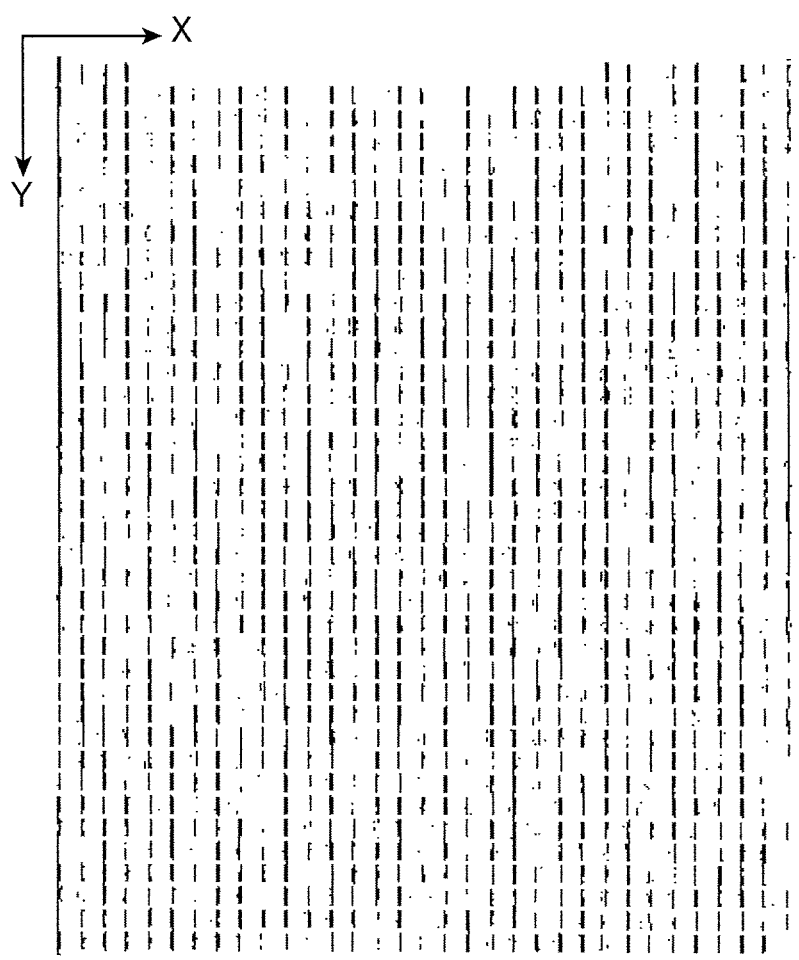
FIG. 13 is a chart showing a binarized vertical edge image of a color chart as an example.
Figure 14:
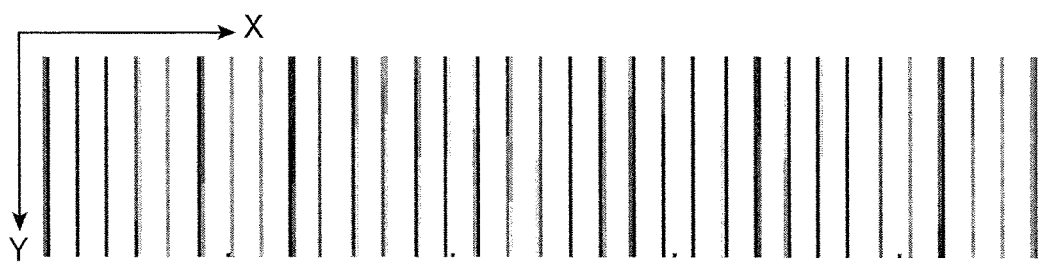
FIG. 14 is a chart showing some of vertical edge lines of the color chart as an example.
Figure 15:
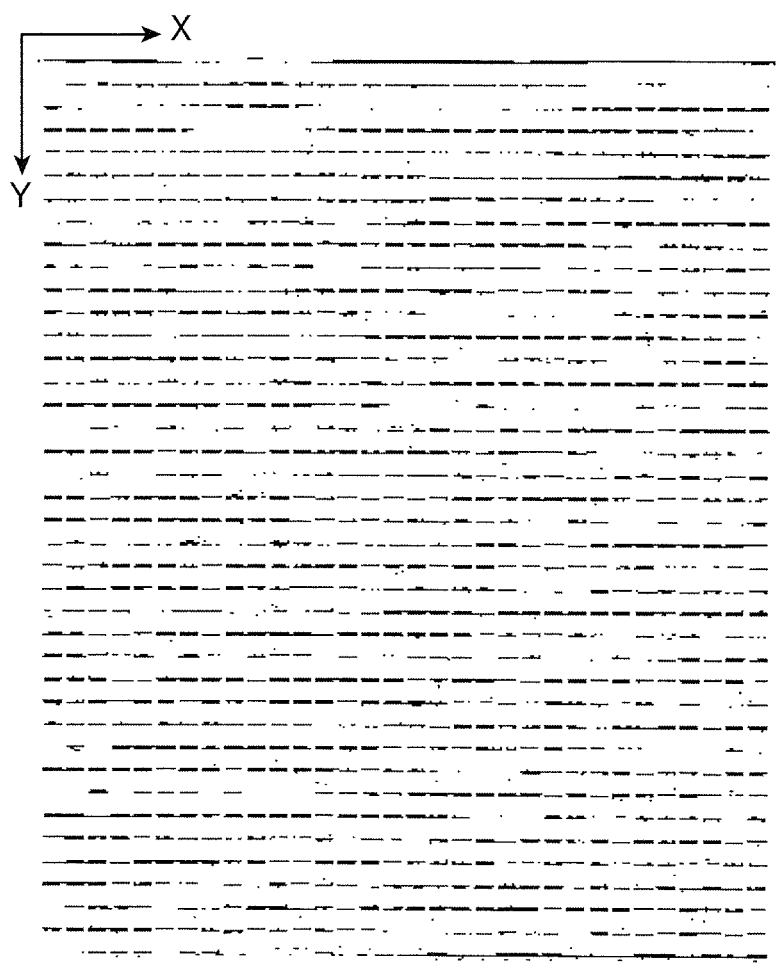
FIG. 15 is a chart showing a binarized horizontal edge image of the color chart as an example.
Figure 16:
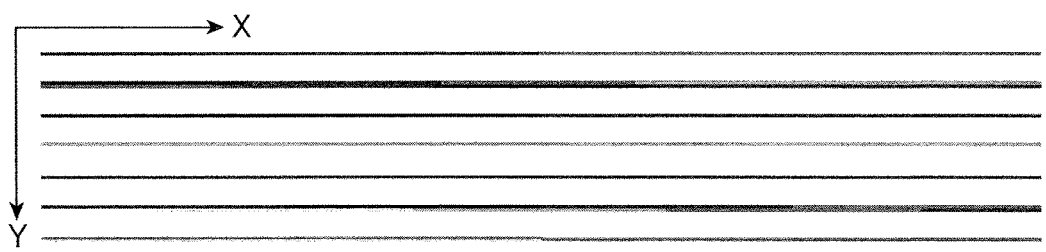
FIG. 16 is a chart showing some of horizontal edge lines of the color chart as an example.
Figure 17:
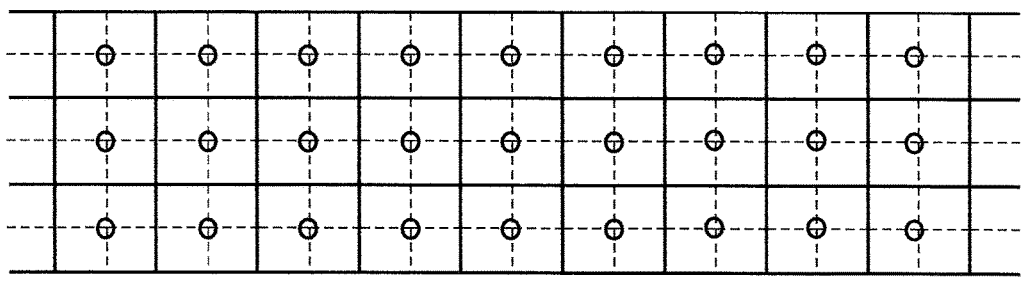
FIG. 17 is a chart showing some of the positions of patches obtained from the vertical edge lines and the horizontal edge lines of the color chart as an example.
Figure 18:
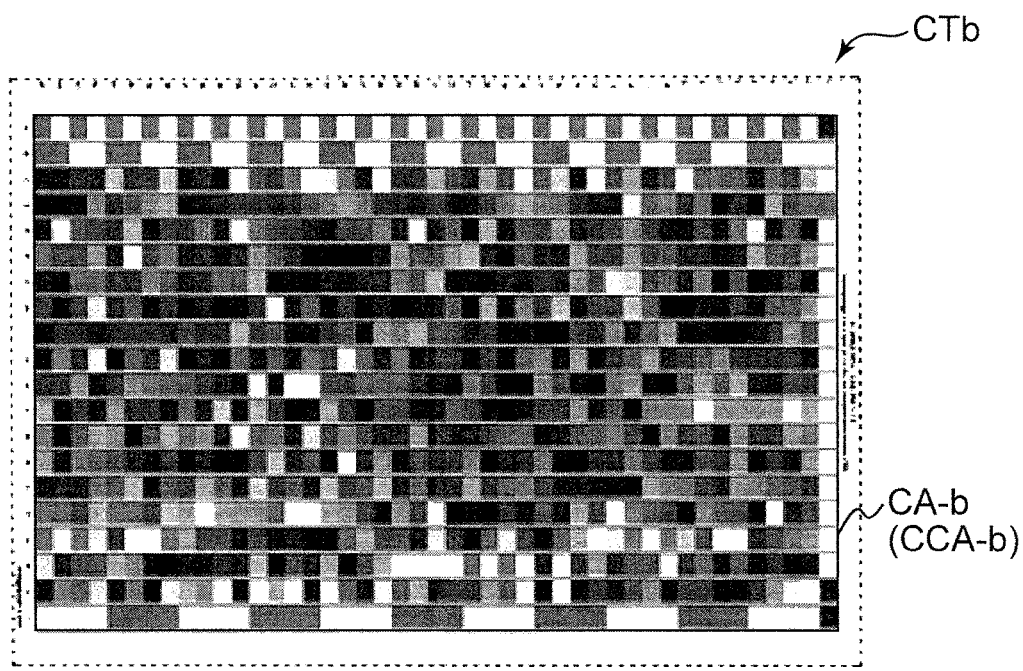
FIG. 18 is a chart showing another example of the color chart, FIG. 19 are charts showing another criteria setting unit in the colorimetry device of the embodiment.
Figure 20:
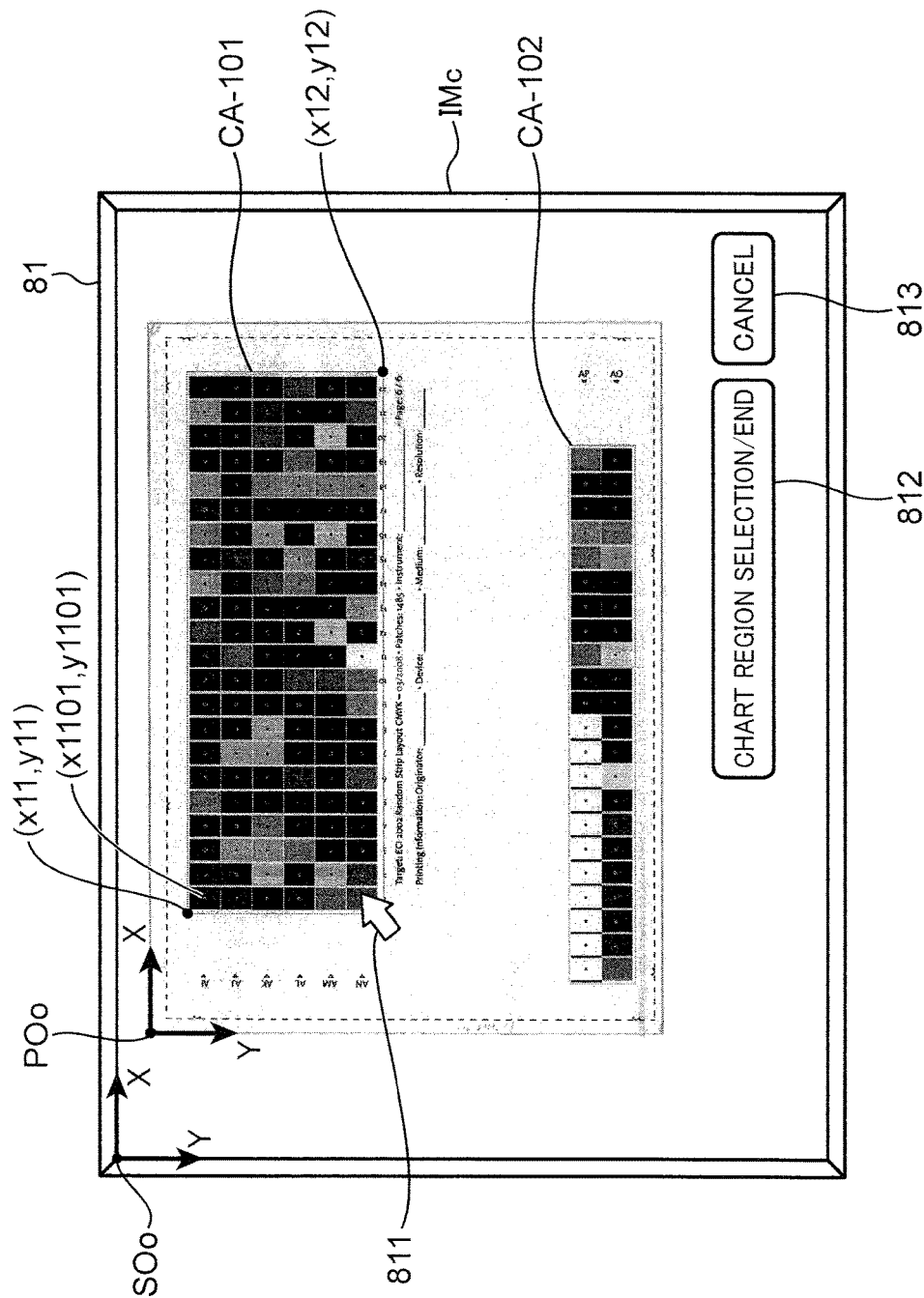
FIG. 20 is a diagram showing an example of a selection screen displayed on an output unit of the colorimetry device of the embodiment, FIG. 21 are tables showing examples of the configurations and contents of display data of chart regions and patch marks displayed on the selection screen of the colorimetry device of the embodiment.

Next, the operation of the colorimetry device in this embodiment is described. FIG. 7 is a flow chart showing the operation of the chart region candidate extraction processing unit in the colorimetry device of the embodiment. FIG. 8 are charts showing the operation of the chart region candidate extraction processing unit in the colorimetry device of the embodiment. FIG. 9 is a flow chart showing the operation of the evaluation index calculation processing unit in the colorimetry device of the embodiment. FIG. 10 are charts showing the operation of the evaluation index calculation processing unit in the colorimetry device of the embodiment. FIG. 11 is a flow chart showing the operation of the chart region determination processing unit in the colorimetry device of the embodiment. FIG. 12 is a chart showing an example of a processing result of processing an image at a certain position in the Y direction by a differential filter having difference interval N points along the horizontal direction for a color chart shown in FIG. 18. FIG. 13 is a chart showing a binarized vertical edge image of the color chart as an example. FIG. 14 is a chart showing some of vertical edge lines of the color chart as an example. FIG. 15 is a chart showing a binarized horizontal edge image of the color chart as an example. FIG. 16 is a chart showing some of horizontal edge lines of the color chart as an example. FIG. 17 is a chart showing some of the positions of patches obtained from the vertical edge lines and the horizontal edge lines of the color chart as an example. In FIG. 17, a solid line indicates the vertical edge line or horizontal edge line, a broken line indicates an intermediate line between the vertical edge lines or an intermediate line between the horizontal edge lines, and ○ indicates the actually measured position of each patch (actually measured patch position). FIG. 18 is a chart showing another example of the color chart. FIG. 20 is a diagram showing an example of a selection screen displayed on the output unit of the colorimetry device of the embodiment. FIG. 21 are tables showing examples of the configurations and contents of display data of chart regions and patch marks displayed on the selection screen of the colorimetry device of the embodiment. FIG. 22 is a flow chart showing the operation of the chart region selection processing unit in the colorimetry device of the embodiment.

Figure 6:
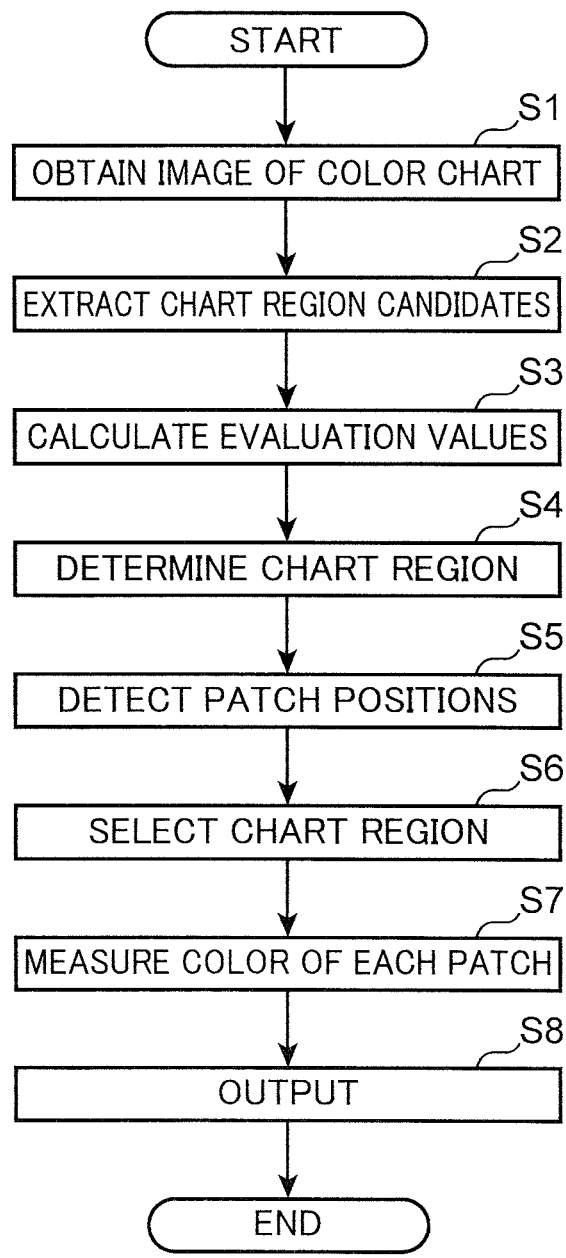
FIG. 6 is a flow chart showing a schematic operation of the colorimetry device in the embodiment.

The colorimetry device CM in this embodiment operates as follows in the case of measuring the color of each patch of the color chart CT. When the color chart CT is set in the sheet feeding unit 1 and the start of the color measurement of the color chart CT is instructed from the input unit 7, the colorimetry device CM first obtains the entire image of the color chart CT, for example by the forward feed by the image acquisition processing unit 62 as shown in FIG. 6 (S1, image acquisition processing step). More specifically, the image acquisition processing unit 62 of the control processing unit 6 obtains the entire image of the color chart CT by imaging the color chart CT for each line extending along the main scanning direction (X direction) by the imaging unit 5 in synchronization with conveyance in the sub scanning direction while conveying the color chart CT by the forward feed by the sub scanning direction moving unit 2 from one end to the other end of the sheet of the color chart CT in the sub scanning direction (Y direction). The obtained entire image of the color chart CT is stored in the memory unit 10.

Figure 8A:
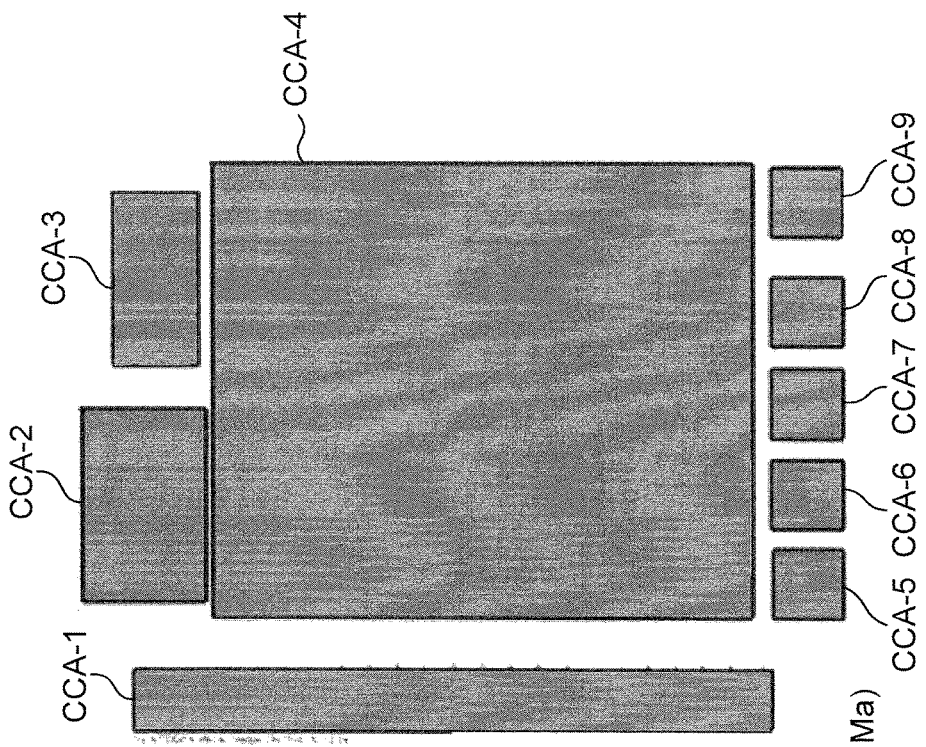

In this way, an image IMa of a color chart CTa shown in FIG. 8A is, for example, obtained. This color chart CTa shown in FIG. 8A includes not only chart regions CA-1 to CA-6 in left and lower parts in a plan view, but also normal image regions IMA-1, IMA-2 of normal images showing goods in an upper part in a plan view and a normal image region IMA-3 of a normal image showing a person in a central part somewhat rightward in a plan view.

Subsequently, the colorimetry device CM extracts the chart region candidates serving as candidates for the chart region where a plurality of patches are present based on the image of the color chart CT obtained by the image acquisition processing unit 62 (S2, chart region candidate extraction processing step).

More specifically, the chart region candidate extraction processing unit 63 of the control processing unit 6 operates as follows. In FIG. 7, the chart region candidate extraction processing unit 63 binarizes the image of the color chart CT obtained by the image acquisition processing unit 62 (S11). More specifically, a pixel value indicating the brightness of each pixel in the image of the color chart CT is compared to a threshold value (first threshold value) th1 set in advance by the chart region candidate extraction processing unit 63. If the brightness pixel value is not smaller than the first threshold value th1 as a result of this comparison, the pixel value of this pixel is set to 0. If the brightness pixel value is below the first threshold value th1, the pixel value of this pixel is set to 1. In this way, the pixel value of each pixel is binarized. The first threshold value th1 is appropriately determined by testing various images.

Subsequently, the chart region candidate extraction processing unit 63 removes noise (S12). In this way, binarized image data is generated. For example, if there are only pixels having a pixel value of 0 around the pixel having a pixel value of 1 (e.g. if the pixel values of all the pixels adjacent to this pixel are 0), the pixel having a pixel value of 1 is determined as noise and the pixel value of this pixel is replaced by 0.

Subsequently, the chart region candidate extraction processing unit 63 generates a region having a pixel value of 1 (significant image region) by compiling a plurality of consecutive pixels having a pixel value of 1 (a plurality of pixels having a pixel value of 1 and adjacent to each other) into one, and assigns a label (e.g. serial number or the like) h of the significant image region as an identifier (ID) for mutual distinction, identification and specification to this generated significant image region (S13).

Subsequently, the chart region candidate extraction processing unit 63 determines whether an area of the significant image region obtained by the processing S13 is not smaller than a minimum patch area set in advance, thereby extracting the significant image region not smaller than the minimum patch area as a chart region candidate, calculates a rectangle (circumscribing rectangle) circumscribing this extracted chart region candidate and stores a calculation result in the memory unit 10 (S14). The minimum patch area is a value set in advance as a minimum area of the patch. Thus, the chart region candidate is not only composed of a plurality of patches, but also composed of one patch. In the calculation of the circumscribing rectangle, coordinate values of four vertices of the circumscribing rectangle of the chart region candidate are, for example, obtained, and these obtained coordinate values are stored in correspondence with a label i of this chart region candidate. Note that an XY orthogonal coordinate system (world coordinate system XY), for example, having a left-upper vertex of an image set as a coordinate origin (world coordinate origin) PO0 is set for this image. This world coordinate system XY is set to have an X axis extending along the X direction (horizontal direction), which is the main scanning direction, and a Y axis orthogonal to the X axis and extending along the Y direction (vertical direction), which is the sub scanning direction.

Figure 8B:
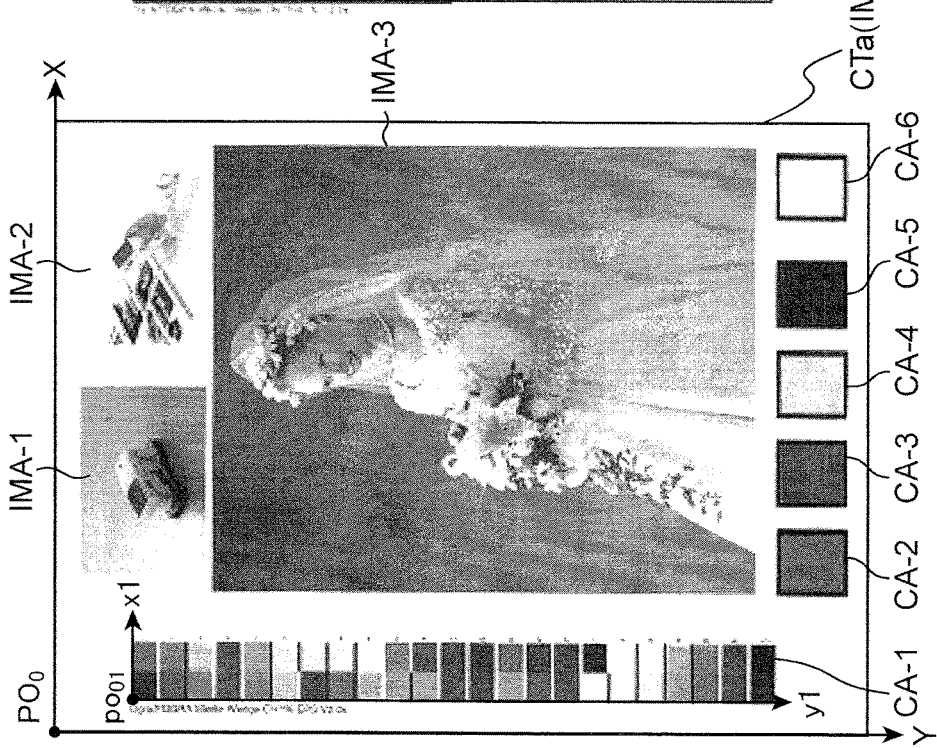

If such processings S11 to S14 are performed on the image IMa of the color chart CTa shown in FIG. 8A, nine chart region candidates CCA-1 to CCA-9 are obtained, and the coordinate values (Xn, Yn) of four vertices are obtained for each of these chart region candidates CCA-1 to CCA-9 and stored in correspondence with the label i (i=an integer of 1 to 9) in the memory unit 10 as shown in FIG. 8B.

Here, the chart region candidate CCA thus obtained is possibly detected as a chart region CA. For example, in a color chart CTb shown in FIG. 18, a chart region candidate CCA-b having a circumscribing rectangle shown in FIG. 18 is detected by the processings of S11 to S14, and this chart region candidate CCA-b matches a chart region CA-b. However, in the color chart CTa including not only the chart regions CA-1 to CA-6 shown in FIG. 8, but also the normal image regions IMA-1 to IMA-3, regions corresponding to the normal image regions IMA-1 to IMA-3 are also extracted as the chart region candidates CCA-2 to CCA-4 as shown in FIG. 8B by the processings of S11 to S14, and the chart region candidates CCA do match the chart regions CA. Thus, the colorimetry device CM in this embodiment further performs the processings of following S3 and S4.

Referring back to FIG. 6, the colorimetry device CM obtains an evaluation value indicating a degree of the chart region candidate CCA being the chart region CA based on the image of the chart region candidate CCA for the chart region candidate CCA extracted by the chart region candidate extraction processing unit 63 (S3, evaluation index calculation processing step).

More specifically, the evaluation index calculation processing unit 64 of the control processing unit 6 operates as follows. In FIG. 9, the evaluation index calculation processing unit 64 obtains the chart region candidate CCA-i of the label i, among the chart region candidates CCA extracted by the chart region candidate extraction processing unit 63, from the memory unit 10 (S21). Note that the label i is assumed to be initialized at 1 when the processing of the evaluation index calculation processing unit 64 is started.

Next, the line image analysis processing unit 641 of the evaluation index calculation processing unit 64 obtains line images (images of line drawing) of the chart region candidate CCA-i based on the image of the chart region candidate CCA-i for the chart region candidate CCA-i of the label i and obtains straight lines included in these obtained line images as analysis lines (S22). More specifically, the line image analysis processing unit 641 applies a differentiation processing and a line thinning processing to the image of the chart region candidate CCA-i using a known image processing filter to generate line images of the line-thinned image. Then, the line image analysis processing unit 641 applies a Hough transform to the line images to obtain the analysis lines. The Hough transform is a known digital image processing for detecting straight lines. Further, the analysis lines may be obtained by a least squares method instead of by the Hough transform. Since the patches are rectangular in this embodiment, the line image analysis processing unit 641 obtains analysis lines (horizontal analysis lines) extending along the horizontal direction (main scanning direction, X direction) and analysis lines (vertical analysis lines) extending along the vertical direction (sub scanning direction, Y direction).

Subsequently, the pixel ratio calculation processing unit 642 of the evaluation index calculation processing unit 64 obtains a total number of the pixels constituting the image IM of the color chart CT obtained by the image acquisition processing unit 62, more preferably a first pixel number Pix(ALL) which is a total number of pixels constituting the chart region candidate CCA-i (S23).

Subsequently, the pixel ratio calculation processing unit 642 superimposes the line images and the analysis lines (horizontal analysis lines and vertical analysis lines in this example) generated by the line image analysis processing unit 641 (S24).

Subsequently, the pixel ratio calculation processing unit 642 obtains a total number of pixels in overlapping parts of the line images within a predetermined range ΔL from the analysis lines as a second pixel number Pix(Lines) (S25). In this embodiment, the pixel ratio calculation processing unit 642 obtains a total number of pixels in overlapping parts of the line images within the predetermined range ΔL from the horizontal analysis lines as a second horizontal pixel number Pix(LinesHor), and a total number of pixels in overlapping parts of the line images within the predetermined range ΔL from the vertical analysis lines as a second vertical pixel number Pix(LinesVer). Note that the pixel ratio calculation processing unit 642 may obtain a total number of pixels in overlapping parts of the line images and the analysis lines as the second pixel number.

Subsequently, the pixel ratio calculation processing unit 642 obtains a ratio of the first pixel number Pix(ALL) and the second pixel number Pix(Lines), and obtains an evaluation value Eva(i) based on this obtained ratio (S26 to S28). More specifically, in this embodiment, the pixel ratio calculation processing unit 642 obtains a ratio of the first pixel number Pix(ALL) and the second vertical pixel number Pix(LinesVer) and sets this obtained ratio as a vertical evaluation value EvaVer(i) (EvaVer(i)=Pix(LinesVer)/Pix (ALL)) (S26). Subsequently, the pixel ratio calculation processing unit 642 obtains a ratio of the first pixel number Pix(ALL) and the second horizontal pixel number Pix (LinesHor) and sets this obtained ratio as a horizontal evaluation value EvaHor(i) (EvaHor(i)=Pix(LinesHor)/Pix (ALL)) (S27). Then, to generate a more reliable evaluation value, the pixel ratio calculation processing unit 642 compares these vertical evaluation value EvaVer(i) and horizontal evaluation value EvaHor(i), sets the smaller value as the evaluation value Eva(i) and stores this obtained evaluation value Eva(i) in the memory unit 10 (S28). Note that a simple average value of these vertical evaluation value EvaVer(i) and horizontal evaluation value EvaHor(i) or a weight average value weighted according to an aspect ratio of the color chart CT may be set as the evaluation value Eva(i).

If the patches are rectangular, the line images and the analysis lines of the chart region CA substantially represent contour lines of the patches. Thus, the line images and the analysis lines match with a relatively high probability. However, the line images and the analysis lines in the normal image region IMA normally do not match very much. For example, if line images and horizontal analysis lines are superimposed for the normal image region IMA-3 showing a human figure in the color chart CTa shown in FIG. 8A, a result shown in FIG. 10A is obtained. If line images and vertical analysis lines are superimposed, a result shown in FIG. 10B is obtained. As is understood by reference to FIGS. 10A and 10B, the line images and the analysis lines in the normal image region IMA-3 do not match very much and there are not many overlapping pixels. Thus, the evaluation value Eva(i) obtained as described above is a good evaluation value indicating a degree of the chart region candidate CCA being the chart region CA.

Note that although the vertical and horizontal analysis lines are obtained and the vertical evaluation value EvaVer (i) and the horizontal evaluation value EvaHor(i) are obtained above, either the vertical analysis lines and vertical evaluation value or the horizontal analysis lines and horizontal evaluation value may be obtained to reduce the amount of information processing. Specifically, only the vertical analysis lines and the vertical evaluation value EvaVer(i) may be obtained and the vertical evaluation value EvaVer(i) may be set as the evaluation value Eva(i) or only the horizontal analysis lines and the horizontal evaluation value EvaHor(i) may be obtained and the horizontal evaluation value EvaHor(i) may be set as the evaluation value Eva(i).

Subsequently, the evaluation index calculation processing unit 64 determines whether or not the evaluation value Eva(i) has been obtained for all the chart region candidates CCA-i (S29). If there is any chart region candidate CCA-i, for which the evaluation value Eva(i) has not been calculated yet, as a result of this determination (No), the label i is incremented by 1 and a return is made to the processing S21. On the other hand, if the calculation of the evaluation value Eva(i) has been finished for all the chart region candidates CCA-i (Yes), the evaluation index calculation processing step S3 is finished.

Referring back to FIG. 6, the colorimetry device CM subsequently determines whether or not the chart region candidate CCA extracted by the chart region candidate extraction processing unit 63 is the chart region CA based on the evaluation value obtained by the evaluation index calculation processing unit 64 corresponding to the chart region candidate CCA extracted by the chart region candidate extraction processing unit 63 by using the criterion (S4, chart region determination processing step).

More specifically, the chart region determination processing unit 65 operates as follows. In FIG. 11, the chart region determination processing unit 65 defines first to fourth rank threshold value Thres1 to Thres4 to sort the evaluation value Eva(i) into five stages (S31). For example, the chart region determination processing unit 65 equally divides a maximum evaluation value Eva(i), and boundary values for equally dividing the maximum evaluation value into five are respectively set as the first to fourth rank threshold values Thres1 to Thres4.

Subsequently, the chart region determination processing unit 65 compares the evaluation value Eva(i) of each chart region candidate CCA-i with each of these first to fourth rank threshold values Thres1 to Thres4 and ranks the evaluation value Eva(i) at any one of the five stages (S32).

Subsequently, the chart region determination processing unit 65 sets a highest rank as a result of ranking in the processing S32 as a base rank BaseRank and sets a rank two stages lower than this base rank BaseRank as a criterion (S33). Since at least one chart region CA is invariably present in the color chart CT, the highest rank is set as the base rank BaseRank and the chart regions up to the chart region candidate CCA-i having a rank two stages lower than this base rank BaseRank are regarded as the chart regions CA.

Subsequently, the chart region determination processing unit 65 determines the chart regions CCA-i not lower than the criterion as the chart regions CA, determines the chart region candidates CCA-i having a rank below the criterion as non-chart regions (S34) and finishes the chart region determination processing step.

For example, if the highest rank is set to be 5 by the processing S32, the criterion is set at 3 by the processing S33 and the chart region candidates CCA-i having any one of the ranks 3, 4 and 5 are determined as the chart regions CA by the processing S34. Further, if the highest rank is, for example, set to be 3 by the processing S32, the criterion is set at 1 by the processing S33 and the chart region candidates CCA-i having any one of the ranks 1, 2 and 3, i.e. all the chart region candidates CCA-i are determined as the chart regions CA.

Referring back to FIG. 6, the colorimetry device CM subsequently obtains the positions of the plurality of patches based on the image IM of the color chart CT obtained by the image acquisition processing unit 62 for the chart region candidates CCA determined as the chart regions CA by the chart region determination processing unit 65, and stores the obtained position of each patch in the memory unit 10 (S5, patch position processing step). For example, the patch position processing unit 66 detects vertical edges extending along the vertical direction (Y direction) using a predetermined edge filter for vertical edge detection and detects horizontal edges extending along the horizontal direction (X direction) using a predetermined edge filter for horizontal edge detection based on the entire image of the color chart CT obtained by the image acquisition processing unit 62. FIG. 12 shows an example of a processing result of processing an image at a certain position in the Y direction by a differential filter having difference interval N points along the X direction for the color chart CTb shown in FIG. 18. Subsequently, the patch position processing unit 65 obtains absolute values of the vertical edges after the edge filter processing, binarizes these obtained absolute values by comparing the absolute values with a threshold value set in advance, and generates image data of the binarized vertical edges. As an example, if the processing result after the edge filter processing is binarized for the image of the color chart CTb shown in FIG. 18, image data of binarized vertical edge images shown in FIG. 13 is, for example, generated. Similarly, the patch position processing unit 65 obtains absolute values of the horizontal edges after the edge filter processing, binarizes these obtained absolute values by comparing the absolute values with a threshold value set in advance, and generates image data of the binarized horizontal edges. As an example, if the processing result after the edge filter processing is binarized for the image of the color chart CTb shown in FIG. 18, image data of binarized horizontal edge images shown in FIG. 15 is, for example, generated. Subsequently, the patch position processing unit 65 applies a Hough transform to each of the image data of the binarized vertical edge of the color chart CT and the image data of the binarized horizontal edges of the color chart CT and detects each vertical edge line and each horizontal edge line. For example, if a Hough transform is applied to the image data of the binarized vertical edges of the color chart CTb shown in FIG. 13, vertical edge lines shown in FIG. 14 are, for example, detected. Further, if a Hough transform is applied to the image data of the horizontal edges of the color chart CTb shown in FIG. 15, horizontal edge lines shown in FIG. 16 are, for example, detected. Then, the patch position processing unit 65 obtains a vertical intermediate line, which is an intermediate line between the vertical edge lines adjacent to each other, for each of the plurality of vertical edge lines, similarly obtains a horizontal intermediate line, which is an intermediate line between the horizontal edge lines adjacent to each other, for each of the plurality of horizontal edge lines, and obtains intersections of a plurality of vertical intermediate lines and a plurality of horizontal intermediate lines as the positions (X, Y) of the respective patches. For example, vertical intermediate lines shown by broken lines in FIG. 17 are obtained if the vertical intermediate lines are obtained based on the vertical edge lines obtained for the color chart CTb shown in FIG. 18, horizontal intermediate lines shown by broken lines in FIG. 17 are obtained if the horizontal intermediate lines are obtained based on the horizontal edge lines, and the respective intersections of these intermediate lines are obtained as the positions (X, Y) of the respective patches as indicated by ○ in FIG. 17. The positions (X, Y) of these respective patches, i.e. the world coordinate values (X, Y) of the respective patches are stored in the memory unit 10.

Subsequently, the colorimetry device CM obtains a desired chart region CA desired for color measurement by the user by the chart region selection processing unit 70 (S6, chart region selection processing step). More specifically, the chart region selection processing unit 70 displays a selection screen 81 on the output unit 8 and obtains the chart region CA selected by the user.

As shown in FIG. 20, an image IMc of the color chart CT, a chart region selection start/end button 812 and a cancel button 813 are displayed in the selection screen 81 displayed on the output unit 8. The chart region selection start/end button 812 is a so-called toggle button. In the case of a chart non-selection state, "Chart Region Selection Start" is displayed in the button 812. If the user depresses the button 812 displaying "Chart Region Selection Start", a chart selection state is set and "Chart Region Selection End" is displayed in the button 812. If the user depresses the button 812 displaying "Chart Region Selection End", the chart selection state is finished to set the chart non-selection state, and the chart region selection processing is finished. The cancel button 813 is a button for canceling the chart region selection processing.

The image IMc of the color chart CT displayed on the selection screen 81 of FIG. 20 includes chart regions CA-101 and CA-102, and a frame is highlighted on four sides of each chart region CA. The highlighted frame is lines having attributes (color, thickness, line type, etc.) determined in advance and displayed to enclose the chart region CA so that the user can recognize the chart region CA detected by the colorimetry device CM. A patch mark (a) is displayed at a center position of each patch in the chart region CA. Note that the chart region CA may be displayed with the attributes of the four sides (frame), the color of the patch marks and the like changed according to the rank of the chart region CA calculated in the chart region determination processing step of the processing S4 and graphics may be changed.

Although the chart region selection processing unit 70 displays the frames so that the user can recognize the chart regions CA in this embodiment, it is sufficient to display such an image that the chart regions CA can be recognized. For example, arrows, circles or the like of a predetermined color may be displayed on four corners of the rectangular chart regions CA. Further, although the chart region selection processing unit 70 displays the circular patch marks in this embodiment, it is sufficient to display such an image that the user can recognize the positions of the patches.

The user clicks the button 812 displaying "Chart Region Selection Start" to set the chart selection state, and clicks the button 812 displaying "Chart Region Selection End" to finish the chart selection state (set the chart non-selection state) after the selection or addition of one or more desired chart regions CA. For example, in the case of selecting the chart region CA, the user moves a cursor 811 of the mouse of the input unit 7 into the chart region CA enclosed by the frame, i.e. the chart region CA detected by the colorimetry device CM and clicks. Further, in the case of selecting the chart region CA not enclosed by the frame, i.e. the chart region CA not detected by the colorimetry device CM, the user WIN-designates the chart region CA to be added by the cursor 811 and designates the WIN-designated chart region CA by clicking a position in this chart region CA where the color measurement of each patch is performed.

The operation of the chart region selection processing unit 70 is described below. FIG. 22 is a flow chart showing the operation of the chart region selection processing unit 70.

The chart region selection processing unit 70 reads the image of the color chart CT from the memory unit 10 and displays this image on the output unit 8 (S41). At this time, the chart region selection processing unit 70 associates the world coordinate system (coordinate origin PO0) of the image of the color chart CT and a screen coordinate system (coordinate origin SO0) and generates a function for converting the world coordinates into the screen coordinates and vice versa. Note that, in this embodiment, it is assumed that the image of the color chart CT is not rotated with respect to the screen for the convenience of description. That is, it is assumed that the X axis (Y axis) of the world coordinate system and an X axis (Y axis) of the screen coordinates system are parallel.

Subsequently, the chart region selection processing unit 70 displays the frame of the chart region CA in a superimposing manner on the displayed image of the color chart CT (S42). More specifically, the chart region selection processing unit 70 reads the world coordinate values (Xn, Yn) of four vertices of the chart region candidate CCA determined as the chart region CA in the chart region determination processing step of the processing S4, out of the world coordinate values (Xn, Yn) of four vertices of each chart region candidate CCA obtained and stored in the chart region extraction processing step of the processing S2, and the label i stored in correspondence with these world coordinate values (Xn, Yn) from the memory unit 10. Then, the chart region selection processing unit 70 generates chart region frame data 1010 shown in FIG. 21A in which one record is registered for each read chart region CA and stores this data in the memory unit 10. More specifically, the chart region selection processing unit 70 sets the read label i as a chart region ID 1011, converts the left-upper coordinate values and the right-upper coordinate values out of the world coordinate values (Xn, Yn) of the corresponding four vertices into screen coordinates using the above function, generates a record for each label i with the screen coordinates obtained by conversion set as region coordinates 1012, and registers the record in the chart region frame data 1010. Then, the chart region selection processing unit 70 displays the frame of each chart region CA on the selection screen 81 using the screen coordinate values set as the region coordinates 1012 of all the records registered in the chart region frame data 1010.

Subsequently, the chart region selection processing unit 70 displays the patch marks (a) as an example of images indicating the positions of the patches obtained by the patch position processing unit in the processing S5 in a superimposing manner on the displayed image of the color chart CT (S43). More specifically, the chart region selection processing unit 70 reads the world coordinate values (X, Y) of each patch obtained and stored in the patch position processing step of the processing S5 from the memory unit 10, generates chart mark data 1020 shown in FIG. 21B for each chart region CA, and stores this data in the memory unit 10. More specifically, the chart region selection processing unit 70 sets the label i of the chart region CA as a chart region ID 1021, converts the world coordinate values (X, Y) of the position of a chart included in this chart region CA into screen coordinates using the above function, generates a record for each patch with the screen coordinates obtained by conversion set as patch mark coordinates 1022, and registers the records in the chart mark data 1020. Then, the chart region selection processing unit 70 displays the respective patch marks on the selection screen 81 using the screen coordinate values set as the patch mark coordinates 1022 of all the records registered in the chart region frame data 1020.

Subsequently, the chart region selection processing unit 70 obtains the operation of the user from the input unit 7 having detected this operation and performs a processing according to the obtained operation. The chart region selection processing unit 70 deletes the selection screen 81 and finishes the processing if obtaining an operation of finishing the processing without the user performing the chart region selection processing, e.g. an operation of depressing the cancel button 813 (S44: No). In this case, it is stored in the memory unit 10 that the selected chart region CA is 0.

If obtaining an operation of depressing the button 812 displaying "Chart Region Selection Start" to set the chart selection state (S44: Yes), the chart region selection processing unit 70 receives an operation of selecting or adding the chart region CA by the user until obtaining an operation of depressing the button 812 displaying "Chart Region Selection End" to finish the chart selection state (set the chart non-selection state) (S45: No).

More specifically, if obtaining the screen coordinates indicating the position of the screen clicked by the user (S46: click), the chart region selection processing unit 70 refers to the chart region frame data 1010 stored in the memory unit 10 and detects the chart region CA including those screen coordinates (S47). More specifically, the chart region selection processing unit 70 judges whether or not the screen coordinates are present in a rectangle indicated by the coordinate values set as the region coordinates 1012 of each record of the chart region frame data 1010, reads the label i set as the chart region ID 1011 in the record set with the coordinate values judged to be present in the rectangle, and stores the label i as an ID of the selected chart region CA in the memory unit 10. The chart region selection processing unit 70 displays the selected chart region CA with the attributes of the frame of this chart region CA changed so that the user can recognize that the chart region CA has been selected. Note that if this chart region CA is clicked again, the chart region selection processing unit 70 may display the chart region CA with the attributes of the frame of the chart region CA changed to those before the change and delete the ID of this chart region CA from the memory unit 10.

Further, if obtaining the screen coordinate pairs indicating the WIN-designated positions on the screen by the user, i.e. two WIN-designated screen coordinate pairs (S46: WIN designation), the chart region selection processing unit 70 detects a rectangular region indicated by the obtained two screen coordinate pairs as the added chart region CA (S48). More specifically, the chart region selection processing unit 70 displays the frame using the obtained two screen coordinate pairs. The chart region selection processing unit 70 generates a new ID (label i), sets it as the chart region ID 1011, generates a record with the obtained two screen coordinate pairs set as the region coordinates 1012, and adds the generated record to the chart region frame data 1011. Then, the chart region selection processing unit 70 stores the newly generated label i as the ID of the selected chart region CA in the memory unit 10. Subsequently, the chart region selection processing unit 70 obtains one or more screen coordinate pairs indicating the position clicked in the WIN-designated region by the user. The chart region selection processing unit 70 displays the patch mark(s) on the obtained screen coordinates. The chart region selection processing unit 70 sets the newly generated label i as the chart region ID 1021, generates one or more records with the obtained screen coordinates set as the patch mark coordinates 1022 and adds the generated record(s) as the chart mark data 1020 to the memory unit 10.

The chart region selection processing unit 70 deletes the selection screen 81 and finishes the processing if obtaining an operation of depressing the button 812 displaying "Chart Region Selection End" to set the chart non-selection state (S45: Yes).

Then, the colorimetry device CM reads the labels i of the chart regions CA selected by the user from the memory unit 10, and measures the colors of a plurality of patches included in the respective chart regions CA indicated by these labels i. Note that, at this time, the position of each patch of the added chart region is obtained by converting the screen coordinates set as the patch mark coordinates 1022 into the world coordinates. In the case of measuring the colors of the plurality of patches at the respective positions of the plurality of patches obtained in this way, the colorimetry device CM causes the color measurement processing unit 67 to relatively move the position of the color measuring unit 3 with respect to the color chart CT to the position of each of the plurality of patches obtained in the patch position processing unit 66 by the sub scanning direction moving unit 2 and the main scanning direction moving unit 4, measures the color of each of the plurality of patches by the color measuring unit 3, and stores a measurement result in the memory unit 10 (S7, color measurement processing step).

Note that the chart region selection processing unit 70 may store the labels i of the chart regions CA selected by the user in the order of selection (in the order of obtaining the chart regions) in the memory unit 10 and the colorimetry device CM may perform color measurement in the order of selection (in the order of obtaining the chart regions).

Further, although the color measurement position of the chart is obtained by the user designation in the case of adding the chart region CA in the processing S48 in the colorimetry device CM of the embodiment, the positions of the patches may be obtained by performing the processings S3 to S5 for the added chart region CA. At this time, the colorimetry device CM may perform the processings S3 to S5 with the criterion lowered by a predetermined value or the user may move a criterion setting slider 682 to change the criterion as described using FIG. 19.

Further, the colorimetry device CM of the embodiment converts the left-upper world coordinate values and the right-lower world coordinate values of the chart region into the screen coordinates and stores the obtained screen coordinates (region coordinates 1012 of the chart region frame data 1010), assuming that the image of the color chart CT is not rotated with respect to the screen in the case of displaying the image of the color chart CT on the screen in the processing S41. Considering a case where the color chart CT is rotated with respect to the screen, the colorimetry device CM may convert the world coordinate values (Xn, Yn) of the four vertices of the chart region into screen coordinate values and store the obtained screen coordinate values. In this case, the user inputs four or three vertices of the designated chart region in adding the chart region by WIN designation in the processing S46.

When the colorimetry device CM measures the color of the last patch by the color measurement processing unit 67, the control unit 61 of the control processing unit 6 outputs the measured color of each of these patches to the output unit 8 and finishes the processing (S8). Note that the control unit 61 of the control processing unit 6 may output the measured color of each patch to the IF unit 9.

As described above, according to the colorimetry device CM and the colorimetry method implemented therein in this embodiment, the chart region candidate CCA serving as a candidate of the chart region CA is extracted from the image IM of the color chart CT by the chart region candidate extraction processing unit 63 (chart region candidate extraction processing step S2), the evaluation value Eva of this chart region candidate CCA is obtained by the evaluation index calculation processing unit 64 (evaluation index calculation processing unit S3), whether or not the chart region candidate CCA is the chart region CA is determined based on the obtained evaluation value Eva by the chart region determination processing unit 65 (chart region determination processing step S4), and the position of each of the plurality of patches is obtained from the chart region candidate CCA determined to be the chart region CA as a result of this determination result, and the color of each of the plurality of patches thus obtained is measured at the position of each patch by the color measuring unit 3. Thus, the colorimetry device CM and the colorimetry method implemented therein in this embodiment can properly determine the chart region CA and automatically measure color at an appropriate position. Particularly, the colorimetry device CM and the colorimetry method implemented therein in this embodiment can properly determine the chart region CA not only for the color chart CTb including only the chart region CA-b shown in FIG. 18, but also for the color chart CTa including the normal image regions IMA-1 to IMA-3 in addition to the chart regions CA-1 to CA-6 shown in FIG. 8A. The colorimetry device CM and the colorimetry method implemented therein in this embodiment can remove stained and damaged patches and the like from targets of color measurement by appropriately setting the criterion, and can reduce erroneous detection of detecting stained and damaged regions of the color chart CT as the positions of the patches.

If the patches are rectangular, it is thought that the line images and analysis lines overlap at many pixels in the chart region CA and the line images and the analysis lines overlap at a small number of pixels in the normal image region IMA. Thus, the colorimetry device CM and the colorimetry method implemented therein in this embodiment obtain the evaluation value Eva based on the ratio of the first pixel number Pix(ALL), which is the number of the pixels of the entire image of the color chart CT, more preferably the number of the pixels of the entire image of the chart region candidate CCA-i, and the second pixel number Pix(Lines), which is the number of the pixels in parts of the line images overlapping on or near the analysis lines. Therefore, a more appropriate evaluation value Eva can be generated.

Since the colorimetry device CM and the colorimetry method implemented therein in this embodiment include the criterion setting unit 68a, a more appropriate criterion can be set and whether or not the chart region candidate CCA is the chart region CA can be determined by a simple processing by using this criterion.

Since the criterion is obtained based on the evaluation value by the criterion setting unit 68a in the colorimetry device CM and the colorimetry method implemented therein in this embodiment, the colorimetry device CM and the colorimetry method implemented therein in this embodiment can automatically set the criterion by the criterion setting unit 68a.

Note that although the criterion setting unit 68a for setting the criterion based on the evaluation value Eva obtained by the evaluation index calculation processing unit 64 is used as the criterion setting unit 68 in the above embodiment, a criterion setting unit 68b for receiving the criterion from outside may be used instead of this criterion setting unit 68a.

FIG. 19 are charts showing another criterion setting unit in the colorimetry device of the embodiment. More specifically, the criterion setting unit 68b displays the image IM of the color chart CT obtained by the image acquisition processing unit 62, a criterion setting bar 681 and the criterion setting slider 682 on the output unit 8 after the execution of the aforementioned evaluation index calculation processing step S3 and before the execution of the chart region determination processing step S4. For example, as shown in FIG. 19, the criterion setting unit 68b displays the image IMa of the color chart CTa in a display area substantially in a center of the output unit 8, and displays the criterion setting bar 681 and the criterion setting slider 682 in a display area below the display area displaying the image IMa of the color chart CTa on the output unit 8. The criterion setting bar 681 is a part for expressing a level (magnitude) of the criterion and, in an example shown in FIG. 19, the criterion setting bar 681 is a part displayed to have a bar-like shape extending in the X direction in a plan view. The criterion is associated with the criterion setting bar 681 to successively become higher (larger) from a left end side to a right end side. The criterion setting slider 682 is a part moved on the criterion setting bar 681 by an input from the input unit 7 such as the mouse to input a desired criterion to the colorimetry device CM. The user (operator) moves the criterion setting slider 682 on the criterion setting bar 681 via the input unit 7. When the criterion setting slider 682 is moved, the criterion setting unit 68b obtains the position of the criterion setting slider 682 on the criterion setting bar 681, receives the criterion having a value corresponding to this obtained position and sets the criterion. The chart region determination processing unit 65 performs the chart region determination processing step S4 using this received criterion. The criterion setting unit 68b displays a predetermined determination mark Mkc in a superimposing manner on the chart region candidate CCA determined to be the chart region CA as a result of performing the chart region determination processing step S4 on the output unit 8. Thus, the user can set an appropriate criterion by moving the criterion setting slider 682 on the criterion setting bar 681 while referring to the determination mark Mkc displayed on the output unit 8.

Figure 19A:
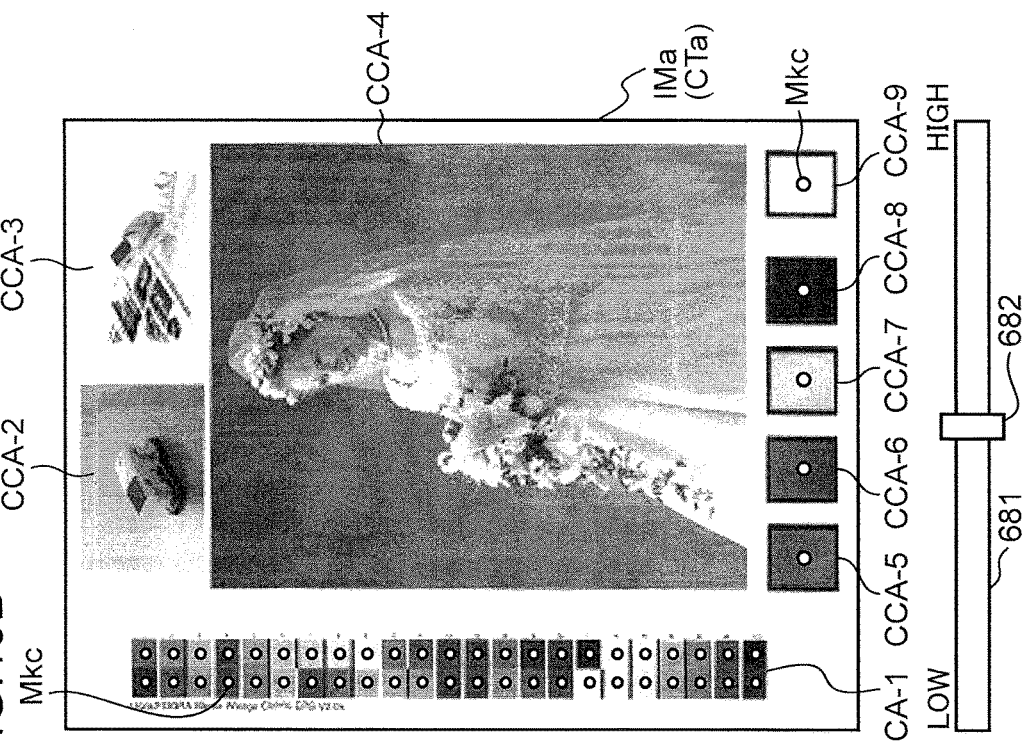
Figure 19B:
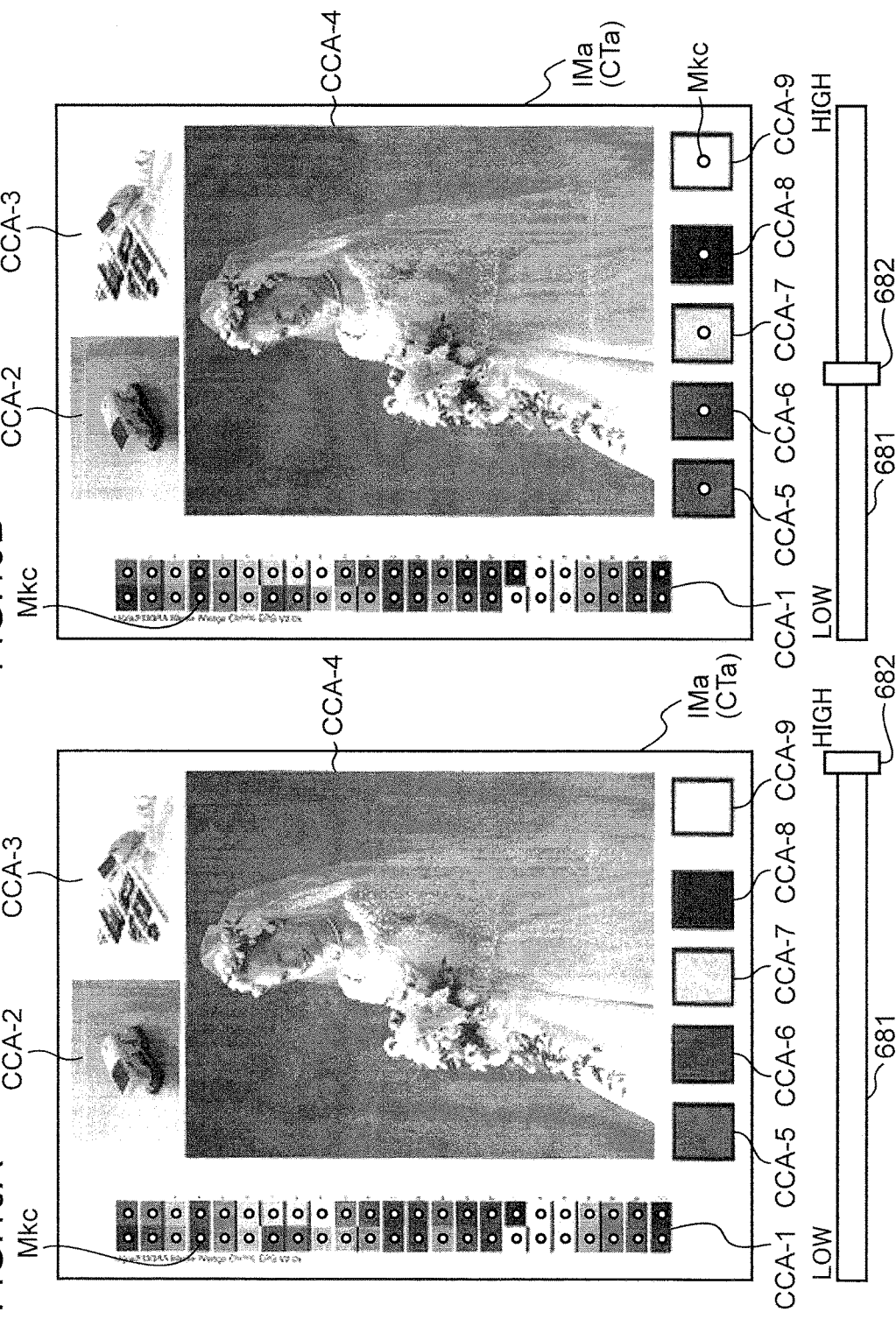

For example, in FIG. 19A, the criterion setting slider 682 is located at the right end position of the criterion setting bar 681 via the input unit 7 by the user, with the result that the criterion is set to be highest (e.g. 5 when five stages are set). With this highest criterion, the determination mark Mkc (○) is displayed in a superimposing manner only on the chart region candidate CCA-1 located on a left side, and only this chart region candidate CCA-1 is determined to be the criterion CA-1. Note that, in the example shown in FIG. 19, the determination mark Mkc is displayed in a superimposing manner on each patch in the chart region candidate CCA-1 determined to be the chart region CA-1. On the other hand, in FIG. 19B, the criterion setting slider 682 is located at a substantially center position of the criterion setting bar 681 via the input unit 7 by the user, with the result that the criterion is set to be medium (e.g. 3 when five stages are set). With this medium criterion, the determination marks Mkc (○) are displayed in a superimposing manner not only on the chart region candidate CCA-1 located on the left side, but also on the chart region candidates CCA-5 to CCA-9 located below, and these chart region candidates CCA-1, CCA-5 to CCA-9 are determined to be the chart regions CA-1, CA-2 to CA-6.

Since the colorimetry device CM including such a criterion setting unit 68b receives the criterion from outside, an appropriate criterion can be set by the user.

Further, although the colorimetry device CM includes the imaging unit 5 with a line sensor or the like having a plurality of photoelectric conversion elements arranged along one direction in the above embodiment, an imaging unit may be provided which includes an area sensor (two-dimensional image sensor) or the like having a plurality of photoelectric conversion elements two-dimensionally arranged in two linear directions independent of each other (e.g. two directions perpendicular to each other or the like) instead of the imaging unit 5. The imaging unit including such an area sensor or the like can image the entire image of the color chart CT even if the color chart CT is not conveyed as described above.

Further, although the movement of the position of the color measuring unit 3 with respect to the measurement object sheet is realized by the movement of the color measuring unit 3 along the main scanning direction by the main scanning direction moving unit 4 and the colorimetry device CM of the measurement object along the sub scanning direction by the sub scanning direction moving unit 2 is realized by the movement of the sheet in the above embodiment, there is no limitation to this. The moving unit for relatively moving the position of the color measuring unit 3 with respect to the measurement object sheet may be a moving mechanism for moving the color measuring unit 3 in two directions, i.e. the main scanning direction and the sub scanning direction, with respect to the measurement object sheet placed in a stationary state on the stage or, for example, may be an XY stage for moving the measurement object sheet placed thereon in two directions, i.e. the main scanning direction and the sub scanning direction with respect to the fixed color measuring unit 3. Further, for example, the moving unit may move the color measuring unit 3 in one of the main scanning direction and the sub scanning direction and move the stage in the other direction. With the moving unit thus configured, the imaging unit including the aforementioned area sensor or the like is preferable.

Various modes of technology are disclosed in this specification as described above. Main techniques of those are summarized below.

A colorimetry device according to one mode includes a display unit, a color measuring unit for measuring color, an imaging unit for obtaining an image, a moving unit for relatively moving the position of the color measuring unit with respect to a measurement object sheet, an image acquisition processing unit for obtaining an image of a color chart having a plurality of patches serving as regions of predetermined colors by the imaging unit, a chart region extraction processing unit for extracting chart regions, where the plurality of patches are present, based on the image of the color chart obtained by the image acquisition processing unit, a patch position processing unit for obtaining the positions of the plurality of patches based on the image of the color chart obtained by the image acquisition processing unit for the chart regions extracted by the chart region extraction processing unit, a chart region selection processing unit for displaying the image of the color chart obtained by the image acquisition processing unit on the display unit and obtaining the chart region selected by a user from the displayed chart regions as a chart region of a colorimetric object, and a color measurement processing unit for relatively moving the position of the color measuring unit with respect to the color chart to the position of each of the plurality of patches obtained by the patch position processing unit in the chart region of the colorimetric object obtained by the chart region selection processing unit and measuring the color of each of the plurality of patches.

Such a colorimetry device measures, for the chart region selected by the user out of the chart regions extracted by the chart region extraction processing unit, the color of each of a plurality of patches in this chart region at the position of each patch by the color measuring unit. Thus, color measurement can be performed at an efficient and appropriate position since the above colorimetry device does not perform color measurement in the chart region not desired by the user. Even if the chart region extraction processing unit extracts a region other than the chart region, e.g. stain, a character string or the like on the color chart as the chart region, such a chart region is not selected by the user. Thus, the above colorimetry device can perform color measurement without any waste. Note that the chart region extraction processing unit is realized by a chart region candidate extraction processing unit, an evaluation index calculation processing unit and a chart region determination processing unit in one embodiment.

In another mode, in the above colorimetry device, the chart region selection processing unit displays images representing the chart regions extracted by the chart region extraction processing unit in a superimposing manner on the image of the color chart obtained by the image acquisition processing unit and obtains the chart region selected by the user from the chart regions having images representing the chart regions displayed in a superimposing manner as the chart region of the colorimetric object.

Such a colorimetry device can easily recognize the extracted chart regions since the images showing the extracted chart regions, e.g. images of frames enclosing the chart regions are displayed in a superimposing manner on the image of the color chart.

In another mode, in these colorimetry devices described above, the color measurement processing unit measures the color of each of the plurality of patches present in the chart region of the colorimetric object in the same order as the order of obtaining the chart regions if the chart region selection processing unit obtains a plurality of chart regions of the colorimetric object.

Since color measurement is performed on the chart regions in the order of selecting the chart regions in such a colorimetry device, the user can easily designate a desired order.

In another mode, in these colorimetry devices described above, the chart region selection processing unit displays images representing the positions of the patches obtained by the patch position processing unit in a superimposing manner on the image of the color chart.

In such a colorimetry device, the patches can be easily recognized since the images representing the positions of the patches, e.g. circular images or the like representing center positions of the patches are displayed in a superimposing manner on the image of the color chart.

In another mode, the above colorimetry device further includes a chart region candidate extraction processing unit for extracting chart region candidates serving as candidates of the chart region where the plurality of patches are present based on the image of the color chart obtained by the image acquisition processing unit, an evaluation index calculation processing unit for obtaining an evaluation value indicating a degree of the chart region candidate being the chart region based on an image of the chart region candidate for the chart region candidate extracted by the chart region candidate extraction processing unit, and a chart region determination processing unit for determining whether or not the chart region candidate extracted by the chart region candidate extraction processing unit is the chart region based on the evaluation value obtained by the evaluation index processing unit corresponding to the chart region candidate extracted by the chart region candidate extraction processing unit, and the chart region extraction processing unit extracts the chart region determined to be the chart region by the chart region determination processing unit and the chart region selection processing unit displays an image representing the position of the patch corresponding to the evaluation value obtained by the evaluation index calculation processing unit in a superimposing manner on the image of the color chart.

Since the image representing the position of the patch corresponding to the evaluation value of the chart region is displayed in such a colorimetry device, the user can select the chart region by referring to the evaluation value.

In another mode, in these colorimetry devices described above, the chart region selection processing unit obtains the chart region selected by the user as the chart region of the colorimetric object if the user selects the chart region present in the image of the color chart and other than the chart regions extracted by the chart region extraction processing unit.

Since the user can select the chart region not extracted by the chart region extraction processing unit in such a colorimetry device, color measurement can be performed at an appropriate position for each of all the chart regions desired by the user.

A colorimetry method according to another mode is a colorimetry method for a colorimetry device with a display unit, a color measuring unit for measuring color, an imaging unit for obtaining an image, a moving unit for relatively moving the position of the color measuring unit with respect to a measurement object sheet, and a control processing unit for controlling the color measuring unit, the imaging unit and the moving unit, and includes an image acquisition processing step of obtaining an image of a color chart having a plurality of patches, which are regions of predetermined colors, by the imaging unit, a chart region extraction processing step of extracting chart regions where the plurality of patches are present based on the image of the color chart obtained in the image acquisition processing step, a patch position processing step of obtaining the positions of the plurality of patches based on the image of the color chart obtained in the image acquisition processing step for the chart regions extracted in the chart region extraction processing step, a chart region selection processing step of displaying the image of the color chart obtained in the image acquisition processing step on the display unit and obtaining the chart region selected by the user from the displayed chart regions as a chart region of a colorimetric object, and a color measurement processing step of relatively moving the position of the color measuring unit with respect to the color chart to the position of each of the plurality of patches obtained in the patch position processing step by the moving unit in the chart region of the colorimetric object obtained in the chart region selection processing step and measuring the color of each of the plurality of patches by the color measuring unit.

Such a colorimetry method measures, for the chart region selected by the user out of the chart regions extracted in the chart region extraction processing step, the color of each of a plurality of patches in the chart region at the position of each patch by the color measuring unit. Thus, color measurement can be performed at an efficient and appropriate position since the above colorimetry method does not perform color measurement in the chart region not desired by the user. Even if a region other than the chart region is extracted as the chart region in the chart region extraction processing step, such a chart region is not selected by the user. Thus, color measurement can be performed without any waste.

This application is based on Japanese Patent Application No. 2015-63720 filed on Mar. 26, 2015, and the contents thereof are included in this application.

To express the present invention, the present invention has been appropriately and sufficiently described through the embodiment with reference to the drawings above. However, it should be recognized that those skilled in the art can easily modify and/or improve the embodiment described above. Therefore, it is construed that modifications or improvements made by those skilled in the art are included within the scope of the appended claims unless those modifications or improvements depart from the scope of the appended claims.

INDUSTRIAL APPLICABILITY

According to the present invention, it is possible to provide a colorimetry device and a colorimetry method for measuring color.

The invention claimed is:

1. A colorimetry device, comprising:
a display unit;
a color measuring unit for measuring color;
an imaging unit for obtaining an image, the imaging unit comprising a plurality of photoelectric conversion elements and being configured to image an optical image of an object;
a moving unit for relatively moving the position of the color measuring unit with respect to a measurement object sheet; and
a control processor, the control processor being configure to perform:
  image acquisition processing that obtains an image of a color chart having a plurality of patches, which are regions of predetermined colors, by the imaging unit;
  chart region extraction processing that extracts chart regions, where the plurality of patches are present, based on the image of the color chart obtained by the image acquisition processing;
  patch position processing that obtains the positions of the plurality of patches based on the image of the color chart obtained by the image acquisition processing for the chart regions extracted by the chart region extraction processing;
  chart region selection processing that facilitates displaying of the image of the color chart obtained by the image acquisition processing on the display unit and obtaining the chart region selected by a user from the displayed chart regions as a chart region of a colorimetric object; and
  color measurement processing that facilitates relative movement of the position of the color measuring unit with respect to the color chart to the position of each of the plurality of patches obtained by the patch position processing in the chart region of the colorimetric object obtained by the chart region selection processing and measuring the color of each of the plurality of patches.

2. The colorimetry device according to claim 1, wherein the chart region selection processing facilitates display of an image representing the chart region extracted by the chart region extraction processing in a superimposing manner on the image of the color chart obtained by the image acquisition processing and obtains the chart region selected by the user from the chart regions having images representing the chart regions displayed in a superimposing manner as the chart region of the colorimetric object.

3. The colorimetry device according to claim 2, wherein the chart region selection processing facilitates display of images representing the positions of the patches obtained by the patch position processing in a superimposing manner on the image of the color chart.

4. The colorimetry device according to claim 3, wherein the control processor is further configured to perform:
  chart region candidate extraction processing that extracts chart region candidates serving as candidates of the chart region where the plurality of patches are present based on the image of the color chart obtained by the image acquisition processing;
  evaluation index calculation processing that obtains an evaluation value indicating a degree of the chart region candidate being the chart region based on an image of the chart region candidate for the chart region candidate extracted by the chart region candidate extraction processing; and
  chart region determination processing that determines whether or not the chart region candidate extracted by the chart region candidate extraction processing is the chart region based on the evaluation value obtained by the evaluation index processing corresponding to the chart region candidate extracted by the chart region candidate extraction processing,
wherein:
the chart region extraction processing extracts the chart region determined to be the chart region by the chart region determination processing; and
the chart region selection processing facilitates display of an image representing the position of the patch corresponding to the evaluation value obtained by the evaluation index calculation processing in a superimposing manner on the image of the color chart.

5. The colorimetry device according to claim 2, wherein the chart region selection processing obtains the chart region selected by the user as the chart region of the colorimetric object if the user selects the chart region present in the image of the color chart and other than the chart regions extracted by the chart region extraction processing.

6. The colorimetry device according to claim 1, wherein the color measurement processing measures the color of each of the plurality of patches present in the chart region of the colorimetric object in the same order as the order of obtaining the chart regions if the chart region selection processing obtains a plurality of chart regions of the colorimetric object.

7. A colorimetry method for a colorimetry device with a display unit, a color measuring unit for measuring color, an imaging unit for obtaining an image, the imaging unit comprising a plurality of photoelectric conversion elements and being configured to image an optical image of an object, a moving unit for relatively moving the position of the color measuring unit with respect to a measurement object sheet, and a control processor that controls the color measuring unit, the imaging unit and the moving unit, the colorimetry method comprising:

- an image acquisition processing step of obtaining an image of a color chart having a plurality of patches, which are regions of predetermined colors, by the imaging unit;
- a chart region extraction processing step of extracting chart regions where the plurality of patches are present based on the image of the color chart obtained in the image acquisition processing step;
- a patch position processing step of obtaining the positions of the plurality of patches based on the image of the color chart obtained in the image acquisition processing step for the chart regions extracted in the chart region extraction processing step;
- a chart region selection processing step of displaying the image of the color chart obtained in the image acquisition processing step on the display unit and obtaining the chart region selected by the user from the displayed chart regions as a chart region of a colorimetric object; and
- a color measurement processing step of relatively moving the position of the color measuring unit with respect to the color chart to the position of each of the plurality of patches obtained in the patch position processing step by the moving unit in the chart region of the colorimetric object obtained in the chart region selection processing step and measuring the color of each of the plurality of patches by the color measuring unit.

* * * * *